US00RE51024E

(19) United States
(12) Reissued Patent
Kurita et al.

(10) Patent Number: US RE51,024 E
(45) Date of Reissued Patent: *Sep. 8, 2026

(54) LIGHT SOURCE DEVICE AND PROJECTION DISPLAY APPARATUS

(71) Applicant: Panasonic Projector & Display Corporation, Osaka (JP)

(72) Inventors: Aya Kurita, Osaka (JP); Michihiro Okuda, Osaka (JP)

(73) Assignee: PANASONIC PROJECTOR & DISPLAY CORPORATION, Osaka (JP)

( * ) Notice: This patent is subject to a terminal disclaimer.

(21) Appl. No.: 18/770,030

(22) Filed: Jul. 11, 2024

Related U.S. Patent Documents

Reissue of:
(64) Patent No.: 11,385,535
Issued: Jul. 12, 2022
Appl. No.: 17/128,873
Filed: Dec. 21, 2020

(30) Foreign Application Priority Data

Dec. 23, 2019 (JP) ..... 2019-231781
Dec. 14, 2020 (JP) ..... 2020-206398

(51) Int. Cl.
*G03B 33/12* (2006.01)
*G02B 27/14* (2006.01)
(Continued)

(52) U.S. Cl.
CPC ..... *G03B 33/12* (2013.01); *G02B 27/141* (2013.01); *G02B 27/283* (2013.01); *G03B 21/16* (2013.01);
(Continued)

(58) Field of Classification Search
CPC .... G03B 33/12; G03B 21/16; G03B 21/2013; G03B 21/2033; G03B 21/008;
(Continued)

(56) References Cited

U.S. PATENT DOCUMENTS 11,550,213 B2 * 1/2023 Kurita ..... G03B 21/2066
2006/0082732 A1 4/2006 Miwa et al.
(Continued)

FOREIGN PATENT DOCUMENTS

JP 2006-126644 5/2006
JP 2006-139245 6/2006
(Continued)

*Primary Examiner* — Kenneth Whittington
(74) *Attorney, Agent, or Firm* — Wenderoth, Lind & Ponack, L.L.P.

(57) ABSTRACT

The light source device includes a first solid-state light source array emitting a first color light, a second solid-state light source array emitting a second color light, a third solid-state light source array emitting a third color light, and a light combiner for combining the first to third color lights respectively from the first to third solid-state light source arrays into a combined color light, and emitting a light flux of the combined color light in the same direction. The third solid-state light source array requiring the lowest target cooling temperature among the first to third solid-state light source arrays is disposed on a first side, and the first and second solid-state light source arrays are disposed on a second side, with an optical axis of the light flux emitted from the light combiner, as a boundary.

17 Claims, 18 Drawing Sheets

(51) Int. Cl.

| | |
|---|---|
| ***G02B 27/28*** | (2006.01) |
| ***G03B 21/00*** | (2006.01) |
| ***G03B 21/16*** | (2006.01) |
| ***G03B 21/20*** | (2006.01) |

(52) U.S. Cl.
CPC ..... *G03B 21/2013* (2013.01); *G03B 21/2033* (2013.01); *G03B 21/008* (2013.01)

(58) Field of Classification Search
CPC ..... G03B 21/2066; G03B 21/2073; G02B 27/141; G02B 27/283
See application file for complete search history.

(56) References Cited

U.S. PATENT DOCUMENTS

| | | | | |
|---|---|---|---|---|
| 2006/0262283 | A1 | 11/2006 | Kurosaki | |
| 2007/0297061 | A1 | 12/2007 | Kyomoto et al. | |
| 2010/0171935 | A1* | 7/2010 | Yamagishi | G03B 21/16 353/52 |
| 2014/0375956 | A1* | 12/2014 | Khrushchev | G03B 21/2033 353/121 |
| 2017/0097562 | A1* | 4/2017 | Wu | G03B 21/20 |
| 2019/0394429 | A1* | 12/2019 | Tanaka | H04N 13/334 |
| 2020/0026170 | A1* | 1/2020 | Chang | G03B 21/16 |
| 2021/0076921 | A1* | 3/2021 | Nagae | A61B 1/0005 |
| 2021/0314537 | A1* | 10/2021 | Narita | G02B 19/0028 |

FOREIGN PATENT DOCUMENTS

| | | | |
|---|---|---|---|
| JP | 2006-323184 | 11/2006 | |
| JP | 2006-337595 | 12/2006 | |
| JP | 2008-256979 | * 10/2008 | G03B 21/14 |
| JP | 2009-58594 | 3/2009 | |
| JP | 2010-271556 | 12/2010 | |
| JP | 2011-102901 | 5/2011 | |
| JP | 2013-65414 | 4/2013 | |
| WO | 2009/008166 | 1/2009 | |

* cited by examiner

LIGHT SOURCE DEVICE AND PROJECTION DISPLAY APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a reissue of U.S. Pat. No. 11,385,535, which issued on Jul. 12, 2022, from application Ser. No. 17/128,873, filed on Dec. 21, 2020.*

BACKGROUND

1. Technical Field

The present disclosure relates to a light source device including a solid-state light source and a light combiner for combining color light emitted from the solid-state light source, and a projection display apparatus including the light source device.

2. Description of the Related Art

Patent Literature (PTL) 1 discloses a projection display apparatus for combining emitted light from each light source using a collimator lens in order to achieve miniaturization and high efficiency of using light in a solid-state light source projector system including a plurality of laser light sources.

PTL 1 is Japanese Patent Application Unexamined Publication No. 2011-102901.

SUMMARY

The present disclosure provides a light source device that can be reduced in size without being affected by an increase in size of a cooling mechanism of a solid-state light source, and a projection display apparatus including the light source device.

The light source device of the present disclosure includes a first solid-state light source array emitting a first color light, a second solid-state light source array emitting a second color light, a third solid-state light source array emitting a third color light, and a light combiner for combining the first to third color lights respectively from the first to third solid-state light source arrays into a combined color light, and emitting a light flux of the combined color light in the same direction. The third solid-state light source array requiring the lowest target cooling temperature among the first to third solid-state light source arrays is disposed on a first side, and the first and second solid-state light source arrays are disposed on a second side, with an optical axis of the light flux emitted from the light combiner, as a boundary.

The light source device of the present disclosure can be reduced in size without being restricted by the cooling mechanism, and further can reduce the size of the projection display apparatus including the light source device.

DETAILED DESCRIPTION

Hereinafter, exemplary embodiments are described in detail appropriately with reference to the drawings. However, unnecessarily detailed descriptions may be omitted. For example, detailed description of well-known matters or repeated description of substantially the same configuration may be omitted to avoid unnecessary redundancy and help a person skilled in the art understand them easily.

Note here that the attached drawings and the following description are provided in order to make a person skilled in the art fully understand the present disclosure, and are not intended to limit the subject matter described in the claims.

First Exemplary Embodiment

Projection Display Apparatus

Figure 1:
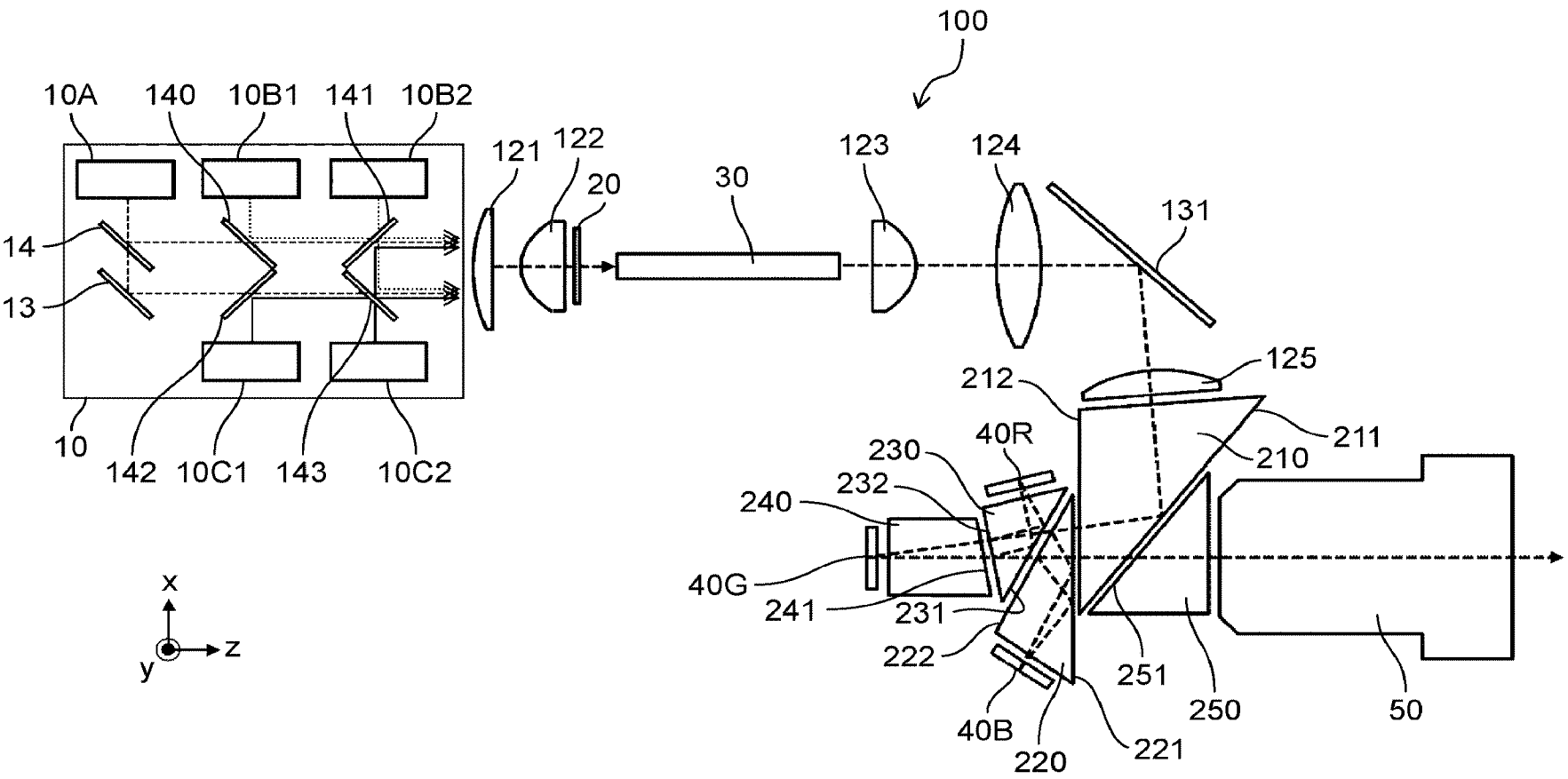
FIG. 1 is a diagram showing a projection display apparatus in accordance with a first exemplary embodiment.

Hereinafter, a configuration of a projection display apparatus in accordance with a first exemplary embodiment is described with reference to FIG. 1. FIG. 1 is a diagram showing an optical configuration of projection display apparatus 100 in accordance with the first exemplary embodiment.

As shown in FIG. 1, firstly, projection display apparatus 100 includes light source device 10 including first solid-state light source array 10A, second solid-state light source arrays 10B1 and 10B2, and third solid-state light source arrays 10C1 and 10C2, rod integrator 30, three DMDs 40R, 40G, and 40B as DMD (digital micromirror device), and projection unit 50.

Figure 3:
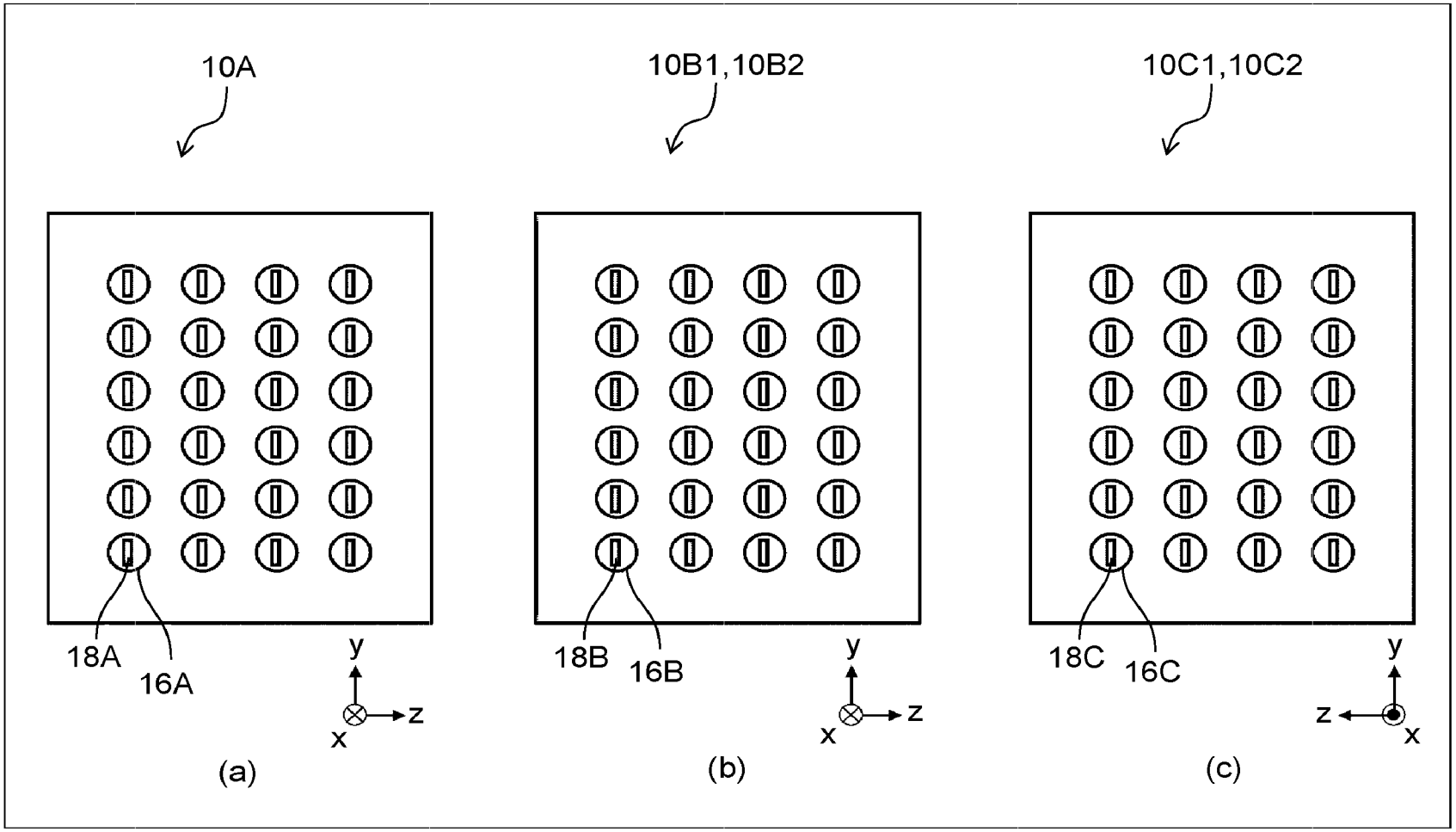
FIG. 3 is a diagram showing a solid-state light source array in accordance with the first exemplary embodiment.

Each of first solid-state light source array 10A, second solid-state light source arrays 10B1 and 10B2, and third solid-state light source arrays 10C1 and 10C2 includes a solid-state light source such as, for example, a laser diode (LD) and a light-emitting diode (LED). In this exemplary embodiment, a laser diode is used as the solid-state light source. In particular, first solid-state light source array 10A uses a laser diode emitting blue light (first color light), second solid-state light source arrays 10B1 and 10B2 use a laser diode emitting green light (second color light), and third solid-state light source arrays 10C1 and 10C2 use red light (third color light). Herein, the laser diode is an example of the laser light source. Note here that details of first solid-state light source array 10A, second solid-state light source arrays 10B1 and 10B2, and third solid-state light source arrays 10C1 and 10C2 are mentioned later (see FIG. 3).

Rod integrator 30 is a solid rod formed of a transparent member such as glass. Rod integrator 30 homogenizes light emitted from light source device 10. Note here that rod integrator 30 may be a hollow rod whose inner wall is made of a mirror surface. Herein, rod integrator 30 is an example of a light-homogenizing element.

DMDs 40B, 40G, and 40R modulate light emitted respectively from first solid-state light source array 10A, second solid-state light source arrays 10B1 and 10B2, and third solid-state light source arrays 10C1 and 10C2, based on an image signal. In detail, each of DMDs 40B, 40G, and 40R includes a plurality of micro-mirrors. The plurality of micro-mirrors is movable. Each micro-mirror basically corresponds to one pixel. Each of DMDs 40B, 40G, and 40R changes whether or not light is reflected toward projection unit 50 side by changing an angle of each micro-mirror.

DMD 40R modulates red component light R based on a red image signal. DMD 40G modulates green component light G based on a green image signal. DMD 40B modulates blue component light B based on a blue image signal. DMDs 40R, 40G, and 40B are a light modulation element, and an example of an image light generating part.

Projection unit 50 magnifies and projects image light modulated by each of DMDs 40R, 40G, and 40B on a projection surface. Projection unit 50 is an example of a projection optical system.

Secondary, projection display apparatus 100 includes necessary lens group and mirror group. The lens group include lenses 121 to 125. The mirror group includes mirror 13, half mirror 14, mirror 131, and dichroic mirrors 140 to 143. Furthermore, projection display apparatus 100 includes necessary diffusion plate 20.

Each of lenses 121 and 122 is a condenser lens for condensing light emitted from first solid-state light source array 10A, second solid-state light source arrays 10B1 and 10B2, and third solid-state light source arrays 10C1 and 10C2, and leading the condensed light to rod integrator 30. Each of lenses 123, 124, and 125 is a relay lens substantially forming an image of light emitted from rod integrator 30 on each of DMDs 40R, 40G, and 40B.

Each of mirrors 13 and 131 is a mirror for bending an optical path. Half mirror 14 is a mirror dividing light emitted from first solid-state light source array 10A, reflecting a part of light flux, and transmitting the remaining light flux. Dichroic mirror 140 is a dichroic mirror transmitting blue light and reflecting green light. Dichroic mirror 141 is a dichroic mirror transmitting blue light and green light and reflecting red light. Dichroic mirror 142 is a dichroic mirror transmitting blue light and reflecting red light. Dichroic mirror 143 is a dichroic mirror transmitting blue light and red light and reflecting green light. Half mirror 14, mirror 13, and dichroic mirrors 140 to 143 are examples of optical elements constituting a light combiner. Note here that details of the dichroic mirrors are described later (see FIGS. 5A to 5D).

Diffusion plate 20 is a diffusion plate disposed in the vicinity of a focus point of the light flux by lens 122, and diffusing the light flux. Diffusion plate 20 has, for example, a configuration in which fine recesses and protrusions are formed on the surface of the glass substrate. Furthermore, the fine recesses and protrusions may be formed on one surface or on both surfaces.

Thirdly, projection display apparatus 100 includes a necessary prism group. The prism group includes prisms 210, 220, 230, 240, and 250.

Prism 210 is made of a translucent member, and has surfaces 211 and 212. An air gap is provided between prism 210 (surface 211) and prism 250 (surface 251), and an angle (angle of incidence) at which light entering prism 210 enters surface 211 is larger than a total reflection angle, and therefore, the light entering prism 210 is reflected by surface 211. On the other hand, an air gap is provided between prism 210 (surface 212) and prism 220 (surface 221). However, since an angle (angle of incidence) at which light reflected by surface 211 enters surface 212 is smaller than the total reflection angle, light reflected by surface 211 transmits surface 212.

Prism 220 is made of a translucent member, and has surfaces 221 and 222. Surface 222 is a dichroic mirror surface transmitting red component light R and green component light G and reflecting blue component light B. Therefore, among the light reflected by surface 211, red component light R and green component light G pass through surface 222, and blue component light B is reflected by surface 222. The blue component light B reflected by surface 222 is reflected by surface 221.

An air gap is provided between prism 210 (surface 212) and prism 220 (surface 221), and an angle (angle of incidence) at which blue component light B firstly reflected by surface 222 and blue component light B emitted from DMD 40B enter surface 221 is larger than the total reflection angle, and therefore, the blue component light B firstly reflected by surface 222 and the blue component light B emitted from DMD 40B are reflected by surface 221. The blue component light B reflected by surface 222 is reflected by surface 221 and enters DMD 40B, and DMD 40B reflects the incident light and emits the light as emitted light. On the other hand, since an angle (angle of incidence) at which the blue component light B reflected by surface 221 and then secondly reflected by surface 222 enters surface 221 is smaller than the total reflection angle, the blue component light B reflected by surface 221 and then secondly reflected by surface 222 passes through surface 221.

Prism 230 is made of a translucent member, and has surfaces 231 and 232. Surface 232 is a dichroic mirror surface transmitting green component light G and reflecting red component light R. Therefore, among the light passing through surface 231, green component light G passes through surface 232, and red component light R is reflected by surface 232. Red component light R reflected by surface 232 is reflected by surface 231. Green component light G emitted from DMD 40G passes through surface 232.

An air gap is provided between prism 220 (surface 222) and prism 230 (surface 231), and an angle (angle of incidence) at which red component light R passing through surface 231 and reflected by surface 232 and red component light R emitted from DMD 40R enter surface 231 again is larger than an total reflection angle, and therefore, the red component light R passing through surface 231 and reflected by surface 232 and the red component light R emitted from DMD 40R are reflected by surface 231. Red component light R reflected by surface 232 is reflected by surface 231, and enters DMD 40R. DMD 40R reflects this incident light and emits it as emitted light. On the other hand, since an angle (angle of incidence) at which red component light R emitted from DMD 40R, reflected by surface 231, and then reflected by surface 232 enters surface 231 again is smaller than the total reflection angle, the red component light R emitted from DMD 40R, reflected by surface 231, and then reflected by surface 232 passes through surface 231.

Prism 240 is made of a translucent member, and has surface 241. Surface 241 is configured to transmit green component light G. Note here that green component light G entering DMD 40G and green component light G emitted from DMD 40G pass through surface 241.

Prism 250 is made of a translucent member, and has surface 251.

In other words, blue component light B (1) is reflected by surface 211, (2) passes through surfaces 212 and 221, and then is reflected by surface 222, (3) is reflected by surface 221, (4) is reflected by DMD 40B, (5) is reflected by surface 221, (6) is reflected by surface 222, and (7) passes through surfaces 221, 212, 211, and 251. Thus, the blue component light B is modulated by DMD 40B, and led to projection unit 50.

Red component light R (1) is reflected by surface 211, (2) passes through surfaces 212, 221, 222, and 231, and then is reflected by surface 232, (3) is reflected by surface 231, (4) is reflected by DMD 40R, (5) is reflected by surface 231, (6) is reflected by surface 232, and (7) passes through surfaces 231, 222, 221, 212, 211, and 251. Thus, red component light R is modulated by DMD 40R, and led to projection unit 50.

Green component light G (1) is reflected by surface 211, (2) passes through surfaces 212, 221, 222, 231, 232, and 241, and then is reflected by DMD 40G, and (3) passes through surfaces 241, 232, 231, 222, 221, 212, 211, and 251. Thus, green component light G is modulated by DMD 40G, and led to projection unit 50.

Light Source Device

Figure 2:
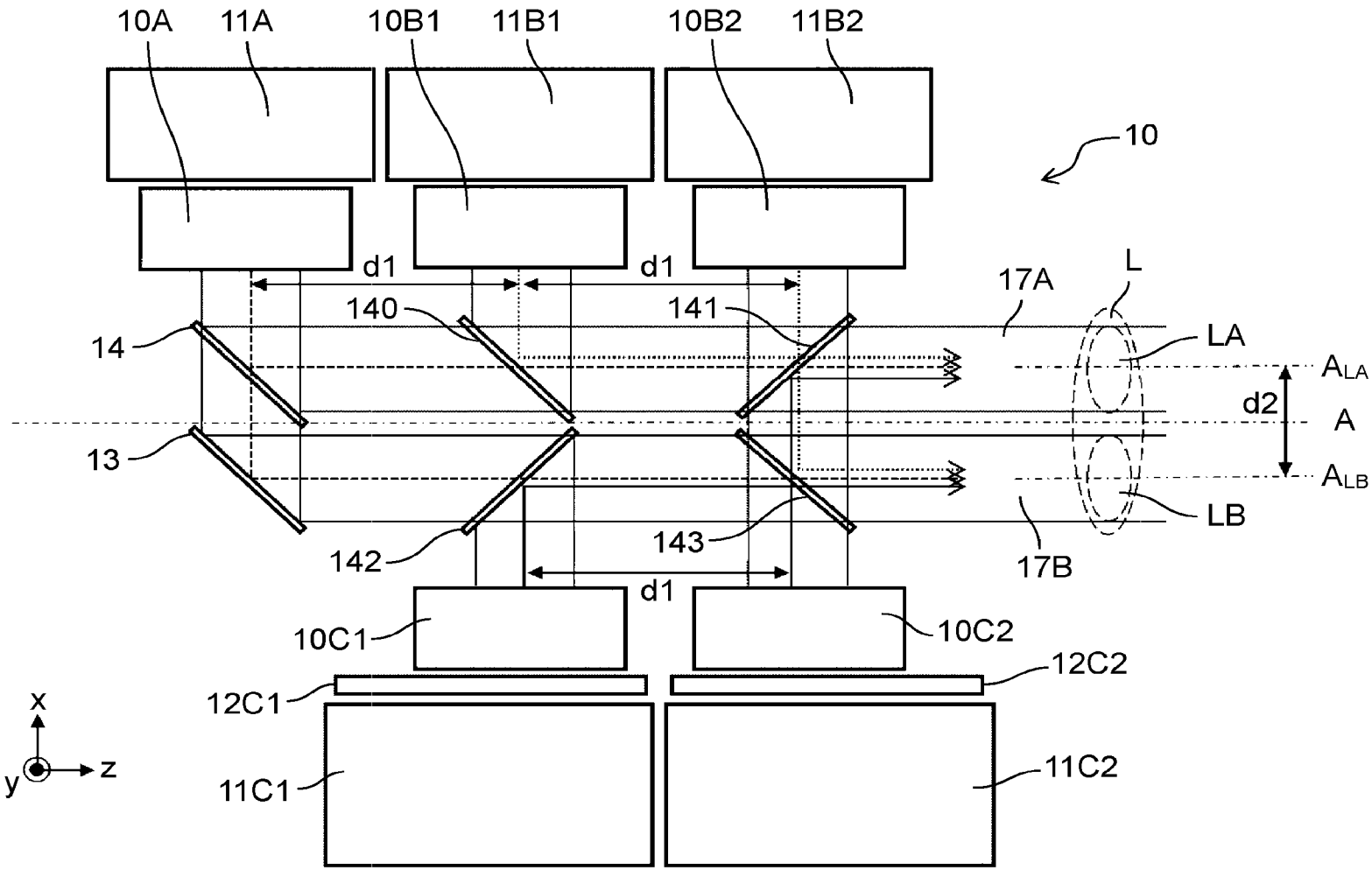
FIG. 2 is a diagram showing a light source device in accordance with the first exemplary embodiment.

Hereinafter, a light source device in accordance with the first exemplary embodiment is described with reference to FIGS. 2 to 5D. FIG. 2 is a diagram showing light source device 10 in accordance with the first exemplary embodiment.

In the first exemplary embodiment, light source device 10 to be used in the projection display apparatus shown in FIG. 1 mainly includes first solid-state light source array 10A, second solid-state light source arrays 10B1 and 10B2, third solid-state light source arrays 10C1 and 10C2, half mirror 14, mirror 13, and dichroic mirrors 140 to 143.

As described in detail later, the first solid-state light source array is a blue solid-state light source array including a blue laser diode emitting blue light as the first color light, the second solid-state light source array is a green solid-state light source array including a green laser diode emitting green light as the second color light, and the third solid-state light source array is a red solid-state light source array including a red laser diode emitting red light as the third color light. That is to say, the green solid-state light source array includes second solid-state light source array 10B1 as the first green solid-state light source array, and second solid-state light source array 10B2 as the second green solid-state light source array; the red solid-state light source array includes third solid-state light source array 10C1 as the first red solid-state light source array, and third solid-state light source array 10C2 as the second red solid-state light source array.

As shown in FIG. 2, with an optical axis A of a light flux L emitted from a light combiner including half mirror 14, mirror 13, and dichroic mirrors 140 to 143 as a boundary, third solid-state light source array 10C1 and third solid-state light source array 10C2 are disposed at a center interval d1 on a first side, while first solid-state light source array 10A and second solid-state light source array 10B1, and second solid-state light source array 10B2 are respectively disposed at a center interval d1, on a second side.

Second solid-state light source array 10B1 and third solid-state light source array 10C1 are disposed to confront each other, and second solid-state light source array 10B2 and third solid-state light source array 10C2 are disposed to confront each other.

Blue light reflected by half mirror 14 among the blue light emitted from first solid-state light source array 10A, green light emitted from second solid-state light source array 10B1, and red light emitted from third solid-state light source array 10C2 are combined by dichroic mirror 140 (first dichroic mirror) reflecting green light and transmitting blue light and dichroic mirror 141 (second dichroic mirror) reflecting red light and transmitting blue and green light, and emitted as a light flux LA of white light in the same direction, and the light flux LA travels on first optical path 17A.

Blue light passing through half mirror 14 and reflected by mirror 13 (first mirror) among the blue light emitted from first solid-state light source array 10A, green light emitted from second solid-state light source array 10B2, and red light emitted from third solid-state light source array 10C1 are combined by dichroic mirror 142 (third dichroic mirror) reflecting red light and transmitting blue light and dichroic mirror 143 (fourth dichroic mirror) reflecting green light and transmitting blue and red light and emitted as a light flux LB of white light in the same direction, and the light flux LB travels on second optical path 17B.

At this time, half mirror 14, mirror 13, and dichroic mirrors 140 to 143 are disposed with the positions thereof being adjusted such that d1>d2 is satisfied when d2 represents a center interval between an optical axis ALA of the light flux LA and an optical axis $A_{LB}$ of the light flux LB. Thus, center interval d2 between the light flux LA traveling on first optical path 17A and the light flux LB traveling on second optical path 17B becomes narrower than center interval d1 of color light emitted from the solid-state light source arrays (second solid-state light source arrays 10B1 and 10B2 or third solid-state light source arrays 10C1 and 10C2) disposed in adjacent to each other. Note here that in this exemplary embodiment, center interval d1 of the solid-state light source arrays has a common value, but it can be appropriately adjusted.

Furthermore, light source device 10 includes a necessary cooling mechanism group. The cooling mechanism group includes cooling mechanism 11A disposed adjacent to first solid-state light source array 10A, cooling mechanism 11B1 disposed adjacent to second solid-state light source array 10B1, and cooling mechanism 11B2 disposed adjacent to second solid-state light source array 10B2, cooling mechanism 11C1 disposed adjacent to third solid-state light source array 10C1, and cooling mechanism 11C2 disposed adjacent to third solid-state light source array 10C2.

Cooling mechanism 11A, cooling mechanism 11B1, and cooling mechanism 11B2 are cooling mechanisms for respectively cooling first solid-state light source array 10A, second solid-state light source array 10B1, and second solid-state light source array 10B2, being able to be used under high temperature conditions in which a laser case temperature is 50° C. to 70° C. Herein, "being able to be used under high temperature conditions in which a laser case temperature is 50° C. to 70° C." means that the laser case temperature of each solid-state light source array is set to 50° C. to 70° C. as a target cooling temperature of first solid-state light source array 10A and second solid-state light source arrays 10B1 and 10B2.

On the other hand, cooling mechanism 11C1 and cooling mechanism 11C2 are cooling mechanisms for respectively cooling third solid-state light source array 10C1 and third solid-state light source array 10C2 requiring to be used under low temperature conditions in which the laser case temperature is 20° C. to 40° C., and disposed adjacent to third solid-state light source array 10C1 and third solid-state light source array 10C2 via Peltier element 12C1 and Peltier element 12C2, respectively. Peltier element 12C1 and Peltier element 12C2 are provided for cooling. Herein, "requiring to be used under low temperature conditions in which the laser case temperature is 20° C. to 40° C." means that the laser case temperature of each solid-state light source array is set to 20° C. to 40° C. as a target cooling temperatures of third solid-state light source arrays 10C1 and 10C2. Therefore, in this exemplary embodiment, third solid-state light source arrays 10C1 and 10C2 are light source arrays requiring the lowest target cooling temperature among the first to third solid-state light source arrays. Note here that each of the cooling mechanism groups is adhesively bonded to a rear surface of the first solid-state light source array, the second solid-state light source array, or the third solid-state light source array, to which each of the cooling mechanism groups is disposed adjacent, via, for example, thermal conductive grease, or the like. The cooling mechanism group is an example of the cooling device.

FIG. 3(a) shows first solid-state light source array 10A viewed in the +x direction of FIG. 2; FIG. 3(b) shows second solid-state light source arrays 10B1 and 10B2 viewed in the +x direction of FIG. 2; FIG. 3(c) shows third solid-state light source arrays 10C1 and 10C2 viewed in the −x direction of FIG. 2.

First solid-state light source array 10A includes a plurality of laser diodes 16A emitting blue light (first color light) having a main wavelength of 465 nm. Second solid-state light source arrays 10B1 and 10B2 include a plurality of laser diodes 16B emitting green light (second color light) having a main wavelength of 525 nm. Third solid-state light source arrays 10C1 and 10C2 include a plurality of laser diodes 16C emitting red light (third color light) having a main wavelength of 640 nm. Note here that blue light may have the other wavelengths in a range of 440 to 470 nm, green light may have the other wavelengths in a range of 515 to 550 nm, and the red light may have the other wavelengths in a range of 630 to 660 nm. Furthermore, a plurality of wavelengths in the above range may be used.

Blue and green laser diodes have relatively good temperature characteristics, can maintain reliability even under high temperature conditions in which the case temperature is 50 to 70° C., and have relatively little reduction in optical output. On the other hand, the red color laser diode has poor temperature characteristics, has difficulty in maintaining the reliability under high temperature conditions, and causes reduction in optical output. Therefore, the red color laser diode is required to keep the case temperature at 20 to 40° C. Each of first solid-state light source array 10A, second solid-state light source arrays 10B1 and 10B2, and third solid-state light source arrays 10C1 and 10C2 has a configuration in which 24 in total of laser diodes 16A, 16B, and 16C, including four laser diodes in the horizontal direction and six laser diodes in the perpendicular direction, are arranged. Laser diodes 16A, 16B, and 16C include emitters 18A, 18B, and 18C respectively emitting light. Each of emitters 18A, 18B, and 18C is integrated with a collimator lens that makes the emitted light into parallel light. From laser diodes 16A, 16B, and 16C, substantially parallel light is emitted.

Emitters 18A, 18B, and 18C are disposed such that the x-axial direction is the short side and the y-axial direction is the long side. The x-axial direction is Fast axis, and the y-axial direction is Slow axis. When the long side direction of an emitter image on an incident surface of rod integrator 30 is made the same as the long side direction of rod integrator 30, a light flux can be allowed to enter the inside of the rod integrator more efficiently. Note here that first solid-state light source array 10A emitting blue light (first color light) and second solid-state light source arrays 10B1 and 10B2 emitting green light (second color light) have a polarization direction in the Slow axial direction, that is, the y-axial direction. Third solid-state light source arrays 10C1 and 10C2 emitting red light (third color light) have a polarization direction in the Fast axial direction, that is, the x-axial direction. The number and arrangement of laser diodes 16A, 16B, and 16C included in each of the solid-state light source arrays are not limited to this example.

Figure 4:
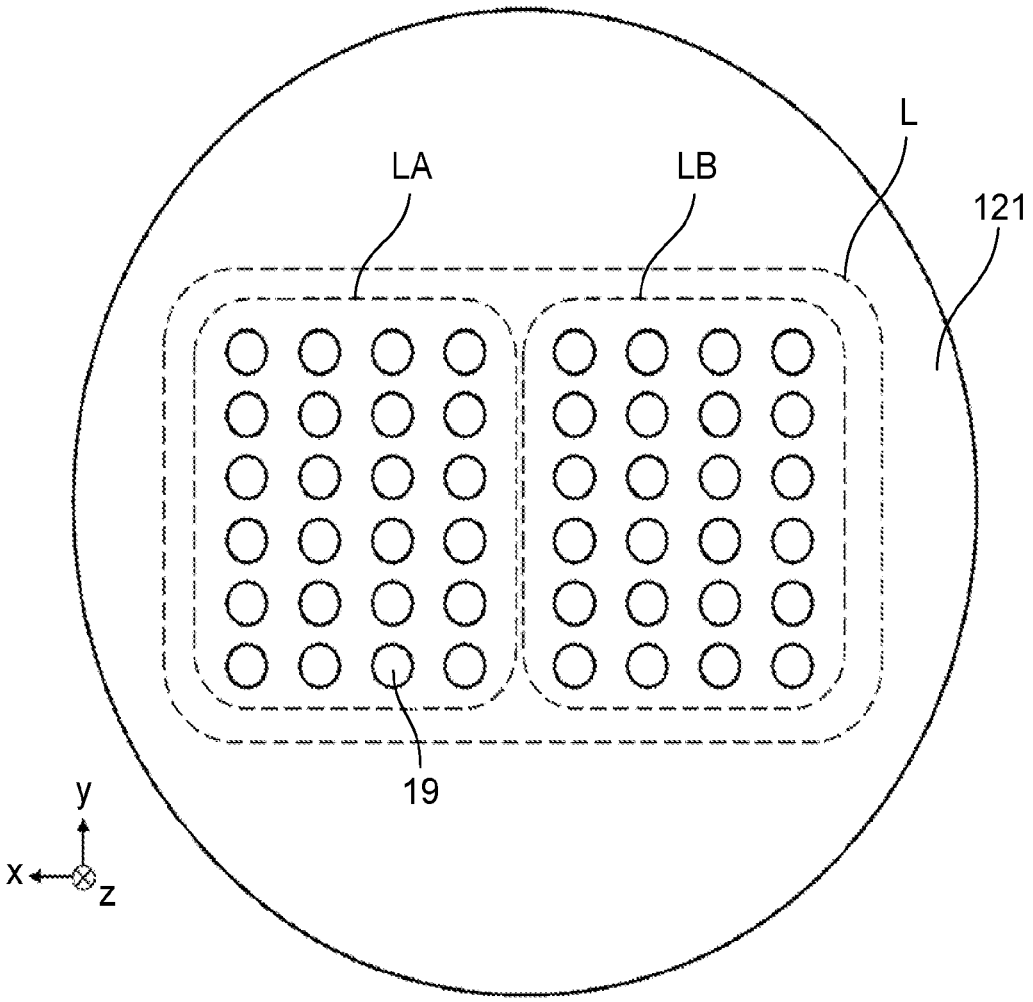
FIG. 4 is a diagram showing a light flux distribution after emission of the light source device in accordance with the first exemplary embodiment.

FIG. 4 shows disposition of the light flux L entering lens 121. The light flux L includes the light flux LA travelling on first optical path 17A and the light flux LB travelling on second optical path 17B. The light fluxes LA and LB include emitter images 19 of FIGS. 3(a) to (c). Each emitter image 19 is a white image combining blue light (first color light), green light (second color light), and red light (third color light). Note here that since the number and arrangement of laser diodes 16A, 16B, and 16C included in each solid-state light source array are not limited to those shown in FIG. 3, also in emitter image 19 shown in FIG. 4, emitter images of blue light, green light, and red light can be disposed such that the respective images are not overlapped to each other.

Figure 6:
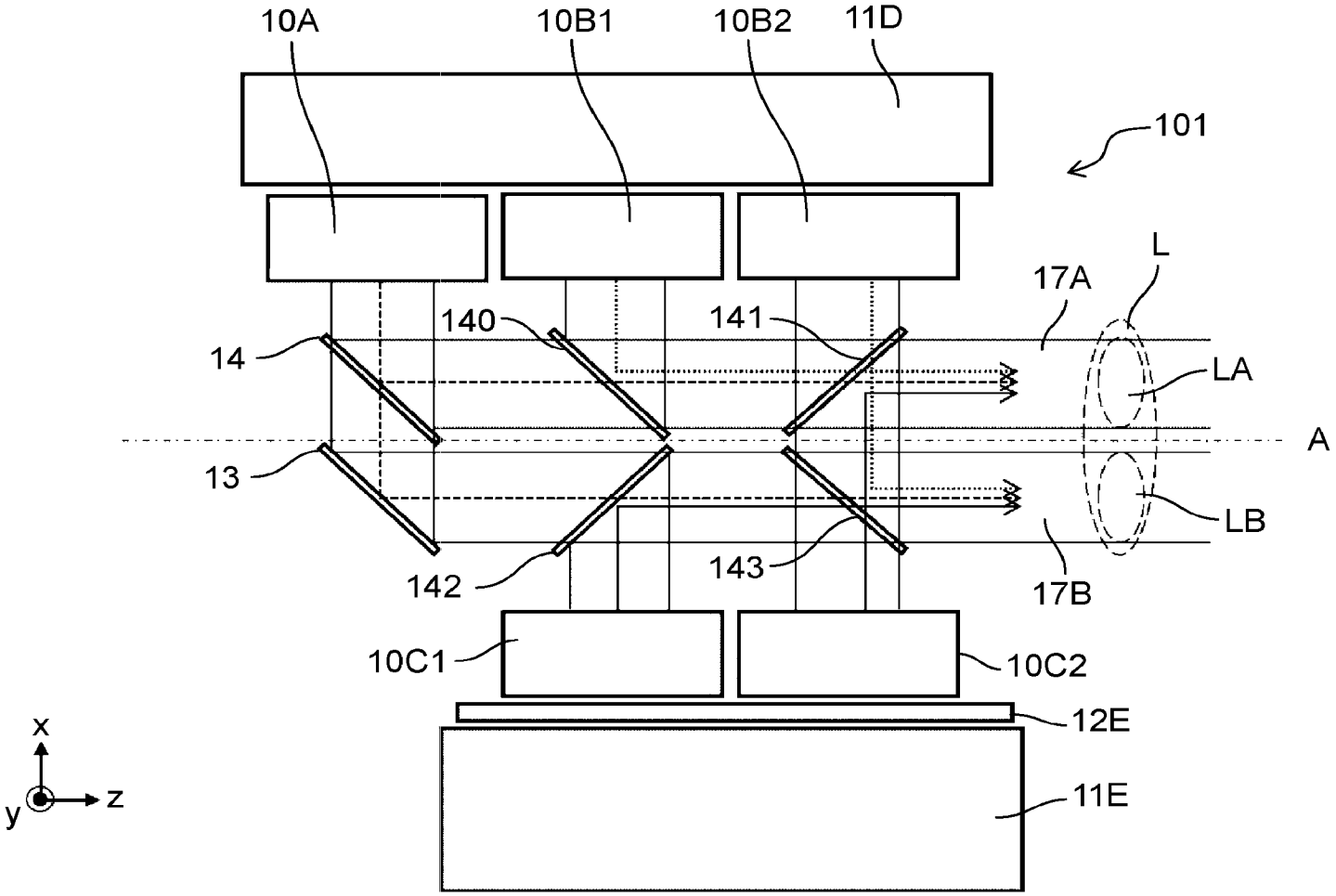
FIG. 6 is a diagram showing a light source device using an integrated cooling mechanism in accordance with the first exemplary embodiment.

FIG. 6 shows a configuration of light source device 101 in which cooling mechanisms 11A, 11B1, 11B2, 11C1, and 11C2 in light source device 10 shown in FIG. 2 are replaced by large cooling mechanisms 11D and 11E. Cooling mechanism 11D is disposed adjacent to first solid-state light source array 10A and second solid-state light source arrays 10B1 and 10B2, disposed on a first side with respect to the optical axis A as a center, and cools the three solid-state light source arrays at one time. Cooling mechanism 11E is a cooling mechanism for cooling third solid-state light source arrays 10C1 and 10C2 disposed on a second side with respect to the optical axis A as a center at one time, and is disposed adjacent to third solid-state light source arrays 10C1 and 10C2 with Peltier element 12E interposed therebetween. Cooling mechanism 11D is a cooling mechanism having a laser case temperature of 50° C. to 70° C. as the target cooling temperature, which is an operating temperature of first solid-state light source array 10A and second solid-state light source arrays 10B1 and 10B2. Cooling mechanism 11E is a cooling mechanism having a laser case temperature of 30° C. to 40° C. as the target cooling temperature, which is an operating temperature of third solid-state light source arrays 10C1 and 10C2. Note here that the configuration of the cooling mechanism group using cooling mechanisms 11D and 11E can be used in configurations of the second to sixth exemplary embodiments described later.

Figure 5A:
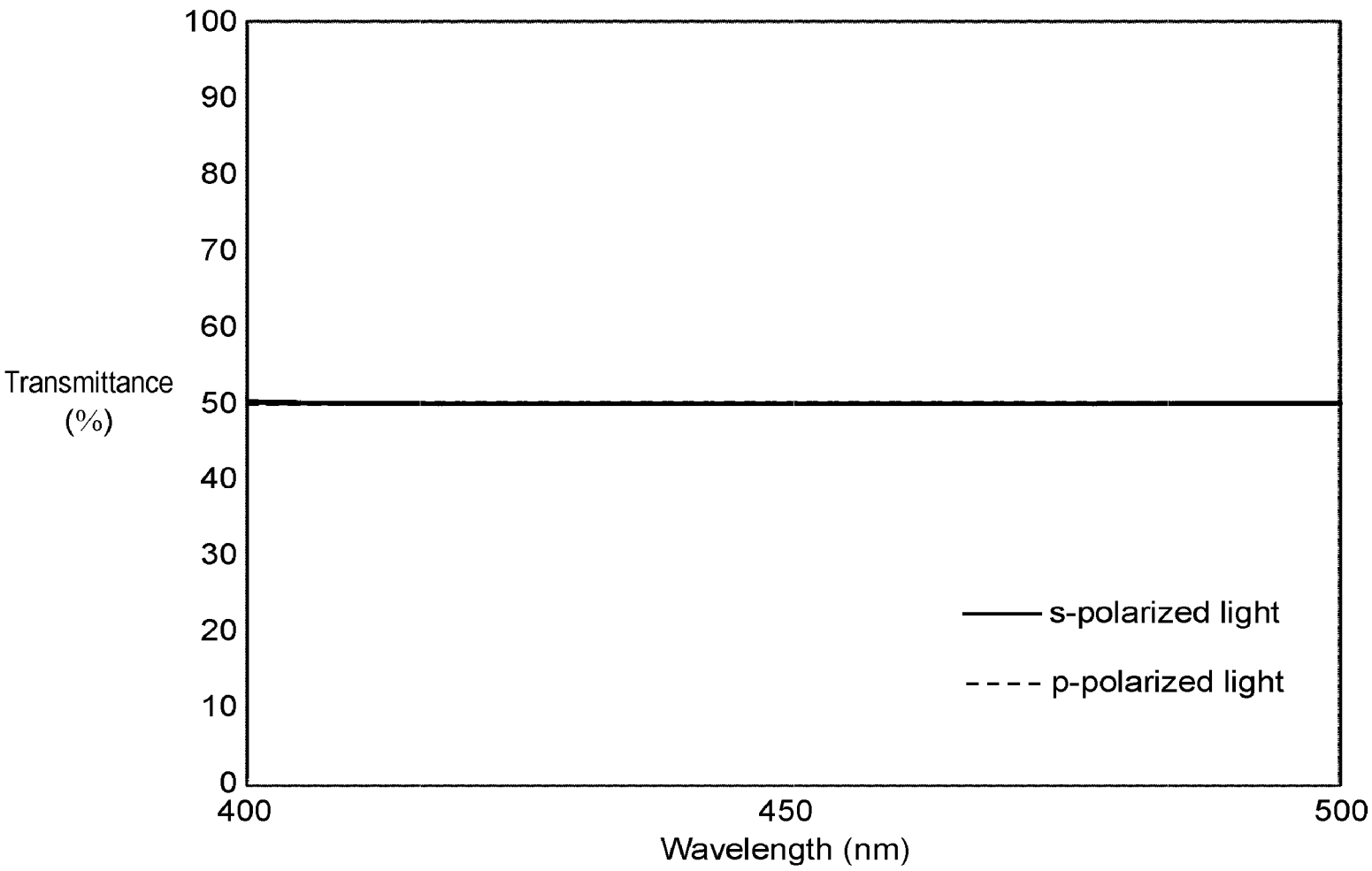
FIG. 5A is a graph showing characteristics of a half mirror in accordance with the first exemplary embodiment.

FIGS. 5A to 5D are characteristic graphs showing transmission characteristics when light enters a half mirror and a dichroic mirror at an angle of incidence of 45°. FIG. 5A is a characteristic graph of half mirror 14, having characteristics of transmitting light having a wavelength in the range of 440 nm to 480 nm by 50% and reflecting the light by 50% with respect to s-polarized incident light. In light source device 10, half mirror 14 transmits s-polarized blue light (first color light) emitted from first solid-state light source array 10A and having a wavelength of 465 nm by 50% and reflects the light by 50%.

Figure 5B:
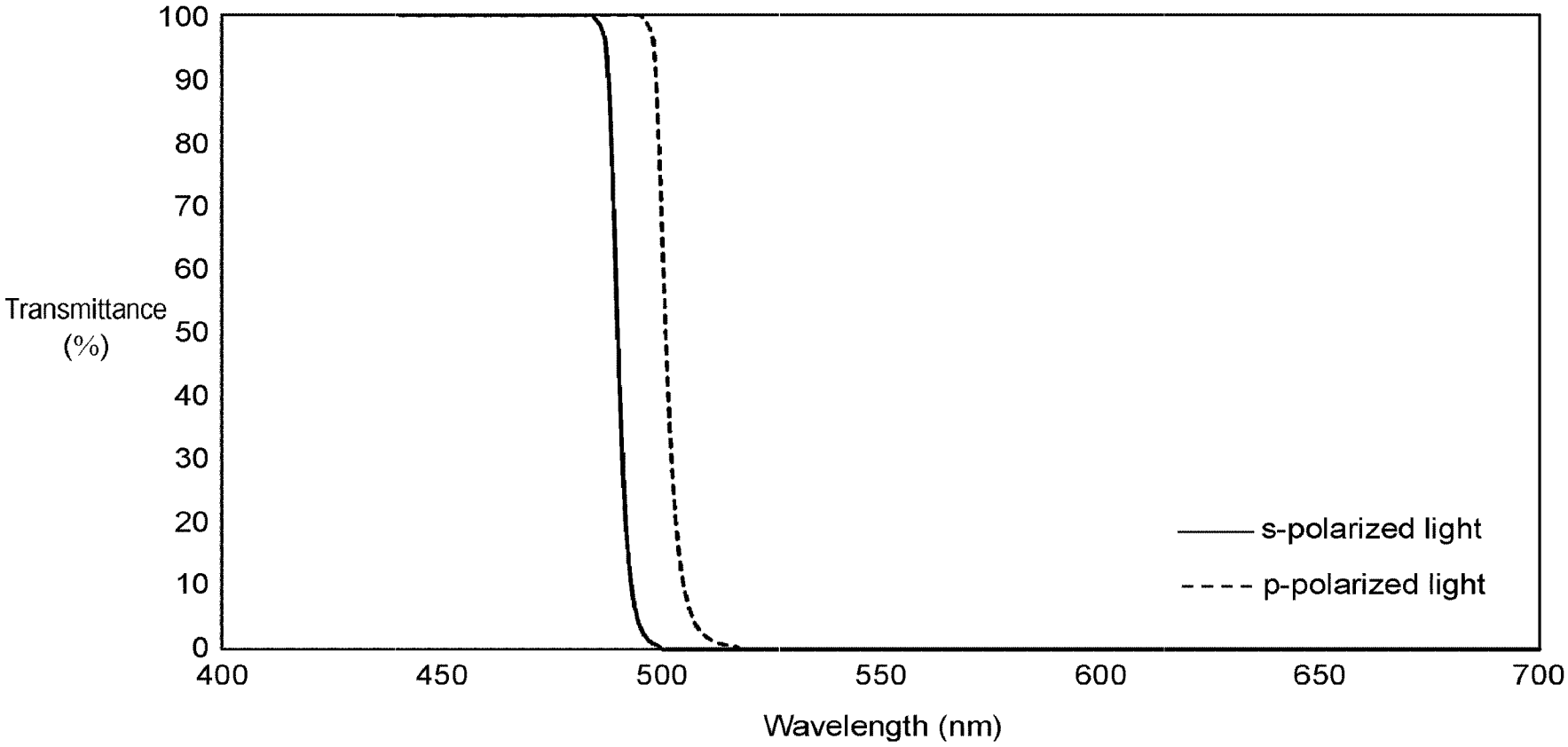
FIG. 5B is a graph showing characteristics of dichroic mirror 140 in accordance with the first exemplary embodiment.

FIG. 5B is a characteristic graph of dichroic mirror 140, having characteristics of transmitting light having a wavelength of 480 nm or less and reflecting light having a wavelength of 510 nm or more with respect to both s-polarized and p-polarized incident light. In light source device 10, dichroic mirror 140 transmits s-polarized blue light (first color light) emitted from first solid-state light source array 10A and having a main wavelength of 465 nm and reflects s-polarized green light (second color light) emitted from second solid-state light source array 10B1 and having a main wavelength of 525 nm.

Figure 5C:
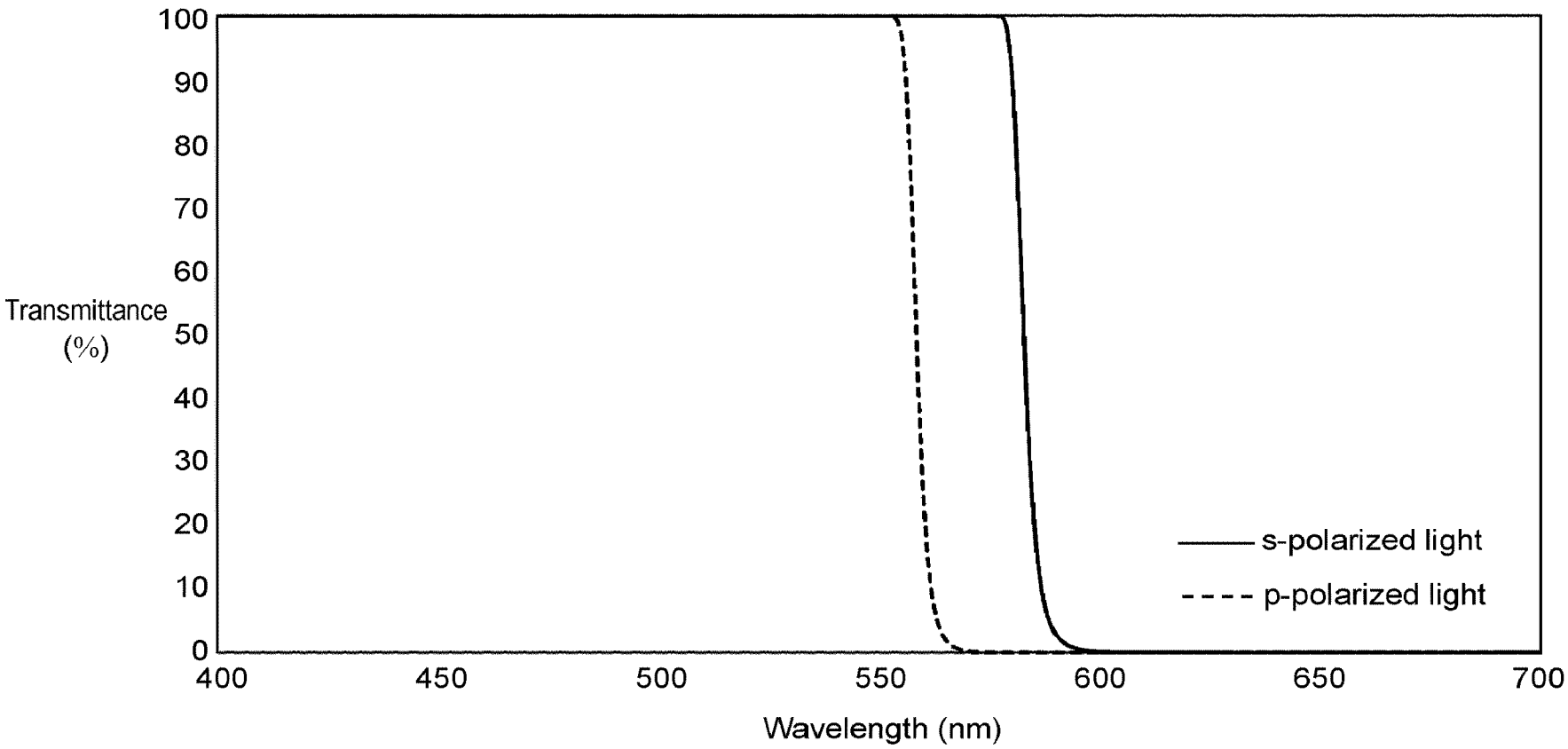
FIG. 5C is a graph showing characteristics of dichroic mirrors 141 and 142 in accordance with the first exemplary embodiment.

FIG. 5C shows characteristic graph of dichroic mirrors 141 and 142, having characteristics of transmitting light having a wavelength 550 nm or less and reflecting light having a wavelength of 570 nm or more with respect to the s-polarized incident light, and transmitting light having a wavelength of 574 nm or less and reflecting light having a wavelength of 594 nm or more with respect to the p-polarized incident light. In light source device 10, dichroic mirror 141 transmits the s-polarized blue light (first color light) emitted from first solid-state light source array 10A and having a main wavelength of 465 nm and s-polarized green light (second color light) emitted from second solid-state light source arrays 10B1 and 10B2 and having a main wavelength 525 nm, and reflects p-polarized red light (third color light) emitted from third solid-state light source array 10C2 and having a main wavelength of 640 nm. In light source device 10, dichroic mirror 142 transmits the s-polarized blue light emitted from first solid-state light source array 10A and having a main wavelength of 465 nm and reflects p-polarized red light emitted from third solid-state light source array 10C1 and having a main wavelength 640 nm.

Figure 5D:
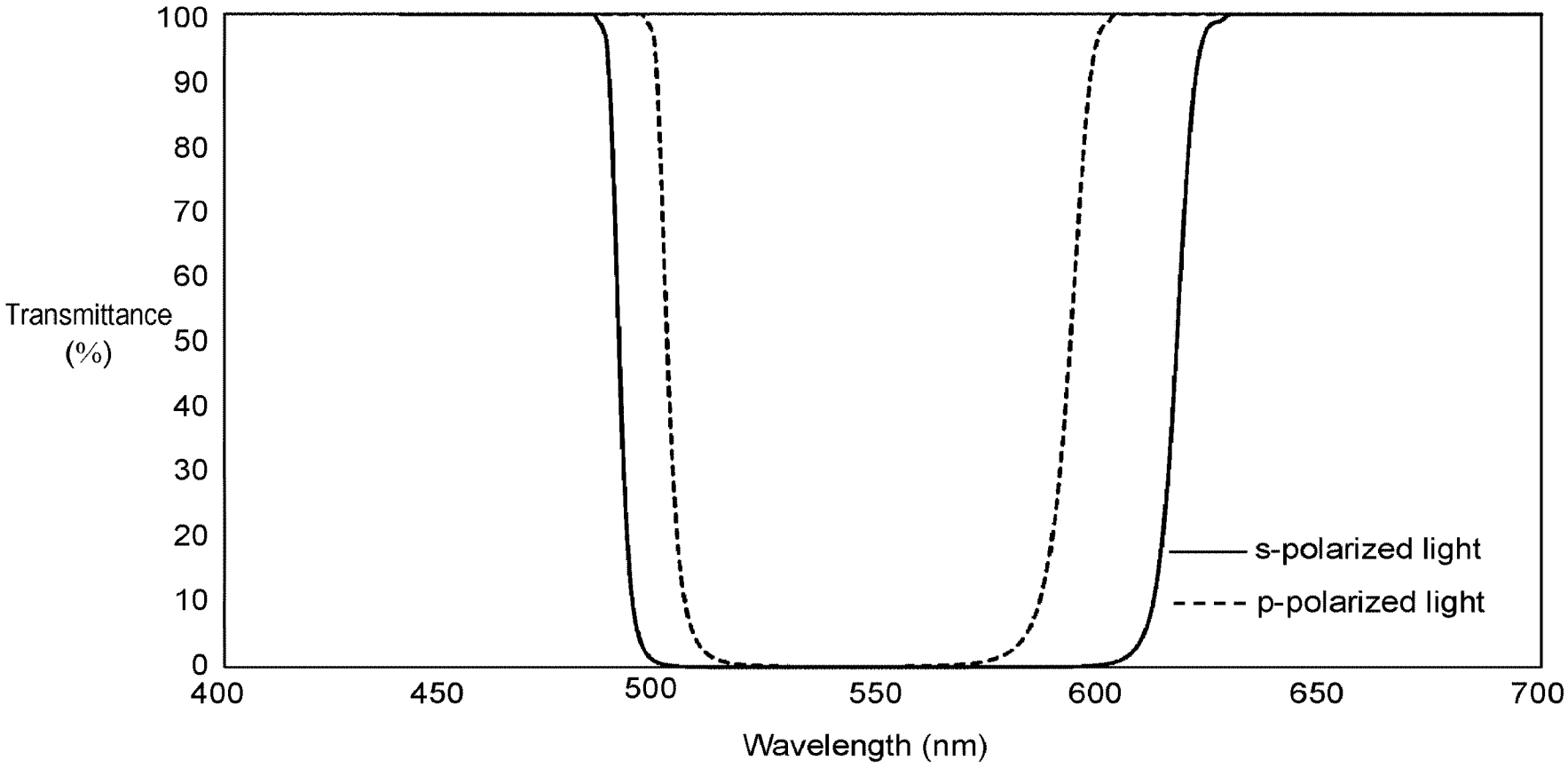
FIG. 5D is a graph showing characteristics of dichroic mirror 143 in accordance with the first exemplary embodiment.

FIG. 5D is a characteristic graph of dichroic mirror 143 having characteristics of transmitting light having a wavelength of 480 nm or less and 630 nm or more and reflecting light having a wavelength in a range of 510 nm to 540 nm in both s-polarized and p-polarized incident light. In light source device 10, dichroic mirror 143 transmits the s-polarized blue light (first color light) emitted from first solid-state light source array 10A and having a main wavelength of 465 nm, reflects s-polarized green light (second color light) emitted from second solid-state light source array 10B2 and having a main wavelength 525 nm, and transmits the p-polarized red light (third color light) emitted from third solid-state light source arrays 10C1 and 10C2 and having a wavelength of 640 nm. Note here that dichroic mirror 140 may be a dichroic mirror having characteristics shown in of FIG. 5D in order to share specifications of those of dichroic mirror 143.

Furthermore, when a dichroic mirror having the characteristics shown in FIG. 5D is used as the dichroic mirror 140, even if a pair of dichroic mirror 140 and dichroic mirror 142, and a pair of dichroic mirror 141 and dichroic mirror 143 are interchanged from each other while the same angle as in FIG. 1 is maintained, the light fluxes LA and LB of white light can be formed similarly. In this case, the light flux LA travelling on first optical path 17A includes a light flux reflected by half mirror 14 among the blue light emitted from first solid-state light source array 10A, the green light emitted from second solid-state light source array 10B2, and the red light emitted from third solid-state light source array 10C1. Light flux LB travelling on second optical path 17B includes a light flux passing through half mirror 14 among the blue light emitted from first solid-state light source array 10A, the green light emitted from second solid-state light source array 10B1, and the red light emitted from third solid-state light source array 10C2.

However, when dichroic mirrors 140 to 143 are disposed as shown in FIG. 1, a difference of length of an optical path in which light of the same color travels can be minimized. That is to say, the difference of length of the optical path between the green light (second color light) emitted from second solid-state light source array 10B1 and the green light (second color light) emitted from second solid-state light source array 10B2, and the difference of length of the optical path between the red light (third color light) emitted from third solid-state light source array 10C1 and the red light (third color light) emitted from third solid-state light source array 10C2 can be minimized.

Operation and Advantageous Effect

In the first exemplary embodiment, with respect to the optical axis A as a boundary, third solid-state light source arrays 10C1 and 10C2 requiring to be used under low temperature conditions are disposed on a first side, and first solid-state light source array 10A and second solid-state light source arrays 10B1 and 10B2 being able to be used under high temperature conditions are disposed on a second side. Thus, with respect to the optical axis A as a boundary, a cooling mechanism for cooling two third solid light source arrays and being capable of temperature control at low temperatures is disposed on a first side, and one first solid light source array and two second solid light source arrays are disposed on a second side. Accordingly, an installation place of a large cooling mechanism capable of temperature control at a low temperature can be effectively secured in the projection display apparatus. Thus, a light source device, and further a projection display apparatus can be reduced in size without being restricted by installation of a large cooling mechanism. Furthermore, light can be allowed to enter a small area by combining light emitted from each solid-state light source array with the use of the mirror group. The interval between the light flux LA travelling on first optical path 17A and the light flux LB travelling on second optical path 17B is narrower than the interval of color light emitted from second solid-state light source array 10B1 and second solid-state light source array 10B2 disposed adjacent to each other, or light emitted from third solid-state light source array 10C1 and third solid-state light source array 10C2 disposed adjacent to each other. Accordingly, the light is allowed to enter a smaller area, so that efficiency of using light is enhanced.

As light source device 101 shown in FIG. 6, when a one-side integrated cooling mechanism is used, since the solid-state light source arrays disposed on both sides with the optical axis A as a center depending on necessary temperature conditions are cooled by the one-side integrated cooling mechanism, a length between solid-state light source arrays can be reduced as compared with light source device 10 shown in FIG. 2 in which a cooling mechanism is disposed for each of the solid-state light source arrays. Thus, the size of the light source device can be further reduced.

Second Exemplary Embodiment

Hereinafter, a second exemplary embodiment is described with reference to FIG. 7. In the following, differences with respect to the first exemplary embodiment are mainly described. Since the other configurations are the same as those in the first exemplary embodiment, the same reference numerals are given to the same components, and a duplicate description thereof is omitted.

Figure 7:
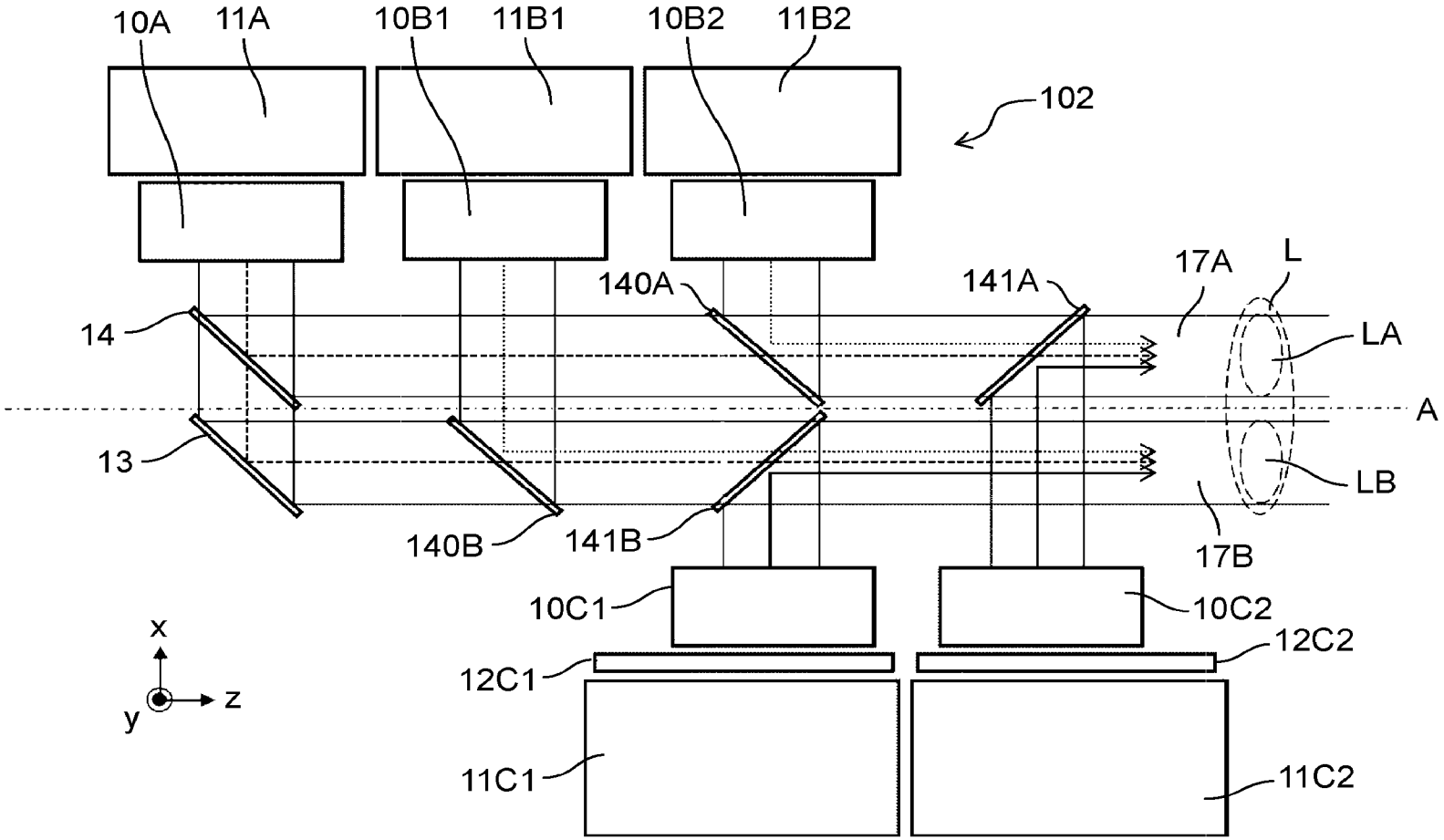
FIG. 7 is a diagram showing a light source device in accordance with a second exemplary embodiment.

FIG. 7 shows a configuration of a principal part of a projection display apparatus in accordance with the second exemplary embodiment, that is, a configuration of light source device 102. Configurations after lens 121 are the same as those shown in FIG. 1. The first exemplary embodiment includes three types of dichroic mirrors having different characteristics, that is, dichroic mirror 140, dichroic mirrors 141 and 142, and dichroic mirror 143. Meanwhile, the second exemplary embodiment includes two types of dichroic mirrors having different characteristics, that is, two dichroic mirrors 140A and 140B and two dichroic mirrors 141A and 141B. Dichroic mirrors 140A and 140B have characteristics shown in FIG. 5B, and dichroic mirrors 141A and 141B have characteristics shown in FIG. 5C.

Blue light reflected by half mirror 14 among blue light emitted from first solid-state light source array 10A, green light emitted from second solid-state light source array 10B2, and red light emitted from third solid-state light source array 10C2 are combined into the light flux LA of white light by dichroic mirror 140A reflecting green light and transmitting blue light and dichroic mirror 141A reflecting red light and transmitting blue and green light, and the light flux LA travels on first optical path 17A.

Blue light passing through half mirror 14 and reflected by mirror 13 among the blue light emitted from first solid-state light source array 10A, green light emitted from second solid-state light source array 10B1, and red light emitted from third solid-state light source array 10C1 are combined into the light flux LB of white light by dichroic mirror 140B reflecting green light and transmitting blue light and dichroic mirror 141B reflecting red light and transmitting blue and green light, and the light flux LB travels on first optical path 17B.

In this exemplary embodiment, half mirror 14, mirror 13, and dichroic mirrors 140A (first dichroic mirror), 140B (third dichroic mirror), 141A (second dichroic mirror), and 141B (fourth dichroic mirror) form a light combiner. Also in this exemplary embodiment, as shown in FIG. 7, with respect to the optical axis A of the light flux L emitted from the light combiner as a boundary, third solid-state light source arrays 10C1 and 10C2 are disposed on a first side, and first solid-state light source array 10A, and second solid-state light source arrays 10B1 and 10B2 are disposed on a second side.

Furthermore, with the change of the disposition configuration dichroic mirrors, the disposed positions of third solid-state light source arrays 10C1 and 10C2 are also changed. In the first exemplary embodiment, second solid-state light source array 10B1 and third solid-state light source array 10C1, and second solid-state light source array 10B2 and third solid-state light source array 10C2 are disposed to confront each other, respectively, with the optical axis A interposed therebetween. Meanwhile, in the second exemplary embodiment, second solid-state light source array 10B2 and third solid-state light source array 10C1 confront each other with the optical axis A as a boundary. Note here that in the second exemplary embodiment, second solid-state light source array 10B2 and third solid-state light source array 10C1 are not necessarily confront each other with the optical axis A as a boundary.

Operation and Advantageous Effect

In the second exemplary embodiment, as in the first exemplary embodiment, since each color light is combined in small size using a mirror group, the efficiency of using light is improved. Furthermore, installation property of the cooling mechanisms can be improved by dividing the installation sides of the solid-state light source arrays depending on each necessary temperature condition, the size of the light combiner can be reduced. In addition, a dichroic mirror for combining color light emitted from each solid-state light source array is formed of two types of dichroic mirrors, that is, dichroic mirrors 140A and 140B transmitting blue light (first color light) and reflecting green light (second color light) and dichroic mirrors 141A and 141B transmitting blue light and green light and reflecting red light (third color light). Thus, dichroic mirror 143 having characteristics of a band-cut type (transmitting blue light, reflecting green light, transmitting red light) (see FIG. 5D), which is used in the first exemplary embodiment, is not required. Accordingly, dichroic mirrors can be produced easily.

Third Exemplary Embodiment

Hereinafter, a third exemplary embodiment is described with reference to FIG. 8. In the following, differences with respect to the first exemplary embodiment are mainly described. Since the other configurations are the same as those in the first exemplary embodiment, the same reference numerals are given to the same components, and a duplicate description thereof is omitted.

Figure 8:
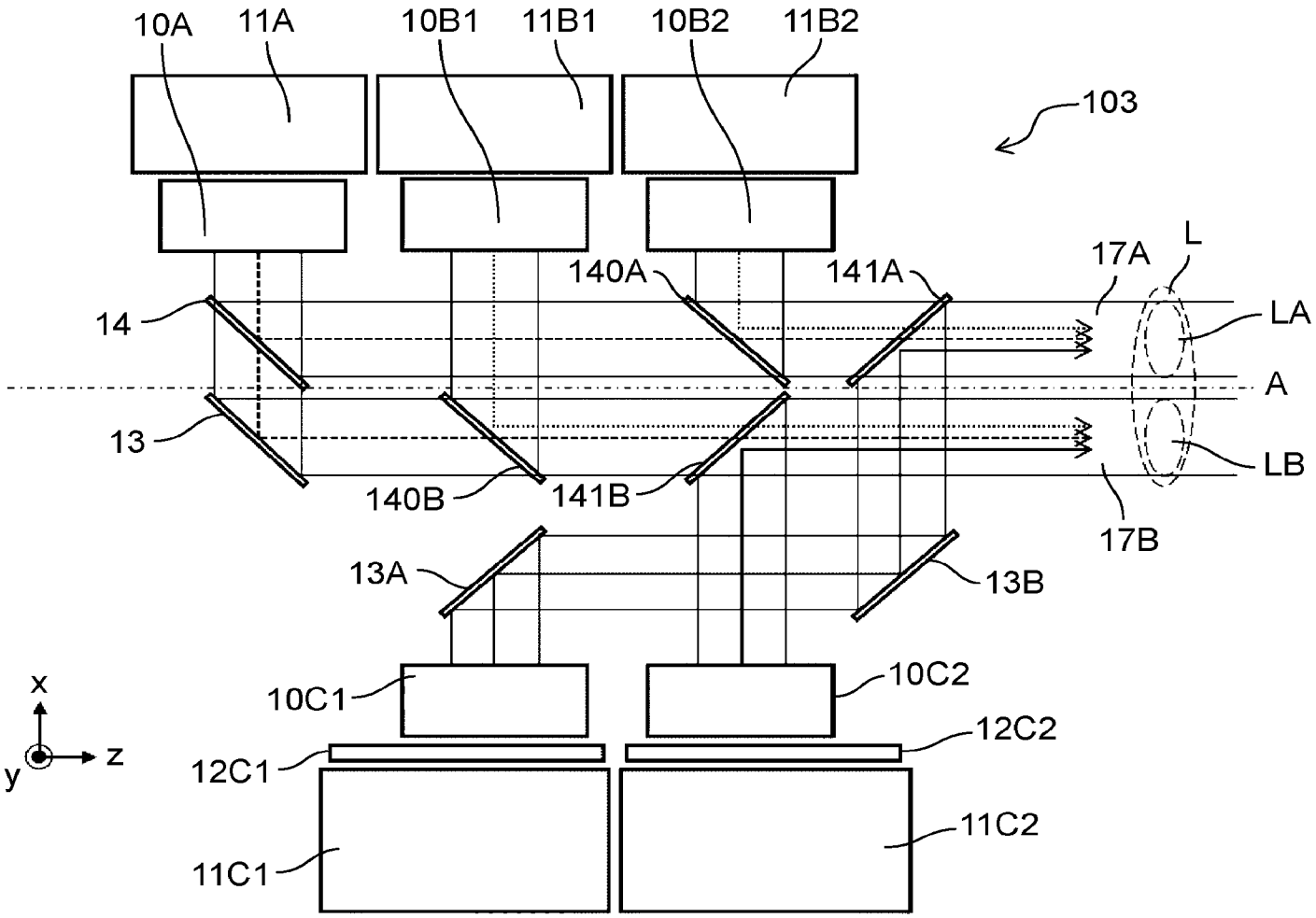
FIG. 8 is a diagram showing a light source device in accordance with a third exemplary embodiment.

FIG. 8 shows a configuration of a principal part of a projection display apparatus in accordance with the third exemplary embodiment, that is, a configuration of light source device 103. Configurations after lens 121 are the same as those shown in FIG. 1. The third exemplary embodiment has a configuration of dichroic mirror, similar to that in the second exemplary embodiment, in which third solid-state light source arrays 10C1 and 10C2 are disposed to confront second solid-state light source arrays 10B1 and 10B2, respectively. Accordingly, in addition to half mirror 14 and mirror 13 similar to those of the second exemplary embodiment, mirrors 13A and 13B are provided. Note here that in the third exemplary embodiment, third solid-state light source arrays 10C1 and 10C2 may not be disposed to confront second solid-state light source arrays 10B1 and 10B2, respectively.

Blue light reflected by half mirror 14 among blue light emitted from first solid-state light source array 10A, green light emitted from second solid-state light source array 10B2, and red light emitted from third solid-state light source array 10C1 and reflected by mirrors 13A and 13B are combined into the light flux LA of white light by dichroic mirror 140A reflecting green light and transmitting blue light and dichroic mirror 141A reflecting red light and transmitting blue and green light, and the light flux LA travels on first optical path 17A.

Blue light passing through half mirror 14 and reflected by mirror 13 among the blue light emitted from first solid-state light source array 10A, green light emitted from second solid-state light source array 10B1, and red light emitted from third solid-state light source array 10C2 are combined into the light flux LB of white light by dichroic mirror 140B reflecting green light and transmitting blue light and dichroic mirror 141B reflecting red light and transmitting blue and green light, and the light flux LB travels on second optical path 17B.

In this exemplary embodiment, half mirror 14, mirror 13 (first mirror), 13A (second mirror), 13B (third mirror), and dichroic mirrors 140A (first dichroic mirror), 140B (third dichroic mirror), 141A (second dichroic mirror), and 141B (fourth dichroic mirror) form a light combiner. Also in this exemplary embodiment, as shown in FIG. 8, with respect to the optical axis A of the light flux L emitted from the light combiner as a boundary, third solid-state light source arrays 10C1 and 10C2 are disposed on a first side, and first solid-state light source array 10A and second solid-state light source arrays 10B1 and 10B2 are disposed on a second side.

Operation and Advantageous Effect

In the third exemplary embodiment, as in the first exemplary embodiment, since each color light is combined in small size using a mirror group, the efficiency of using light is improved. When the installation sides of the solid-state light source arrays are divided depending on each necessary temperature condition, and solid-state light source arrays are disposed to confront both sides with the optical axis A as a center, the interval between the solid-state light source array and lens 121 is broadened, and further cooling mechanisms are easily installed. Furthermore, as in the second exemplary embodiment, dichroic mirror 143 having characteristics of a band-cut type (transmitting blue light, reflecting green light and transmitting red light) (see FIG. 5D) is not required, thus facilitating production of dichroic mirrors.

Fourth Exemplary Embodiment

Hereinafter, a fourth exemplary embodiment is described with reference to FIG. 9. In the following, differences with respect to the first exemplary embodiment are mainly described. Since the other configurations are the same as those in the first exemplary embodiment, the same reference numerals are given to the same components, and a duplicate description thereof is omitted.

Figure 9:
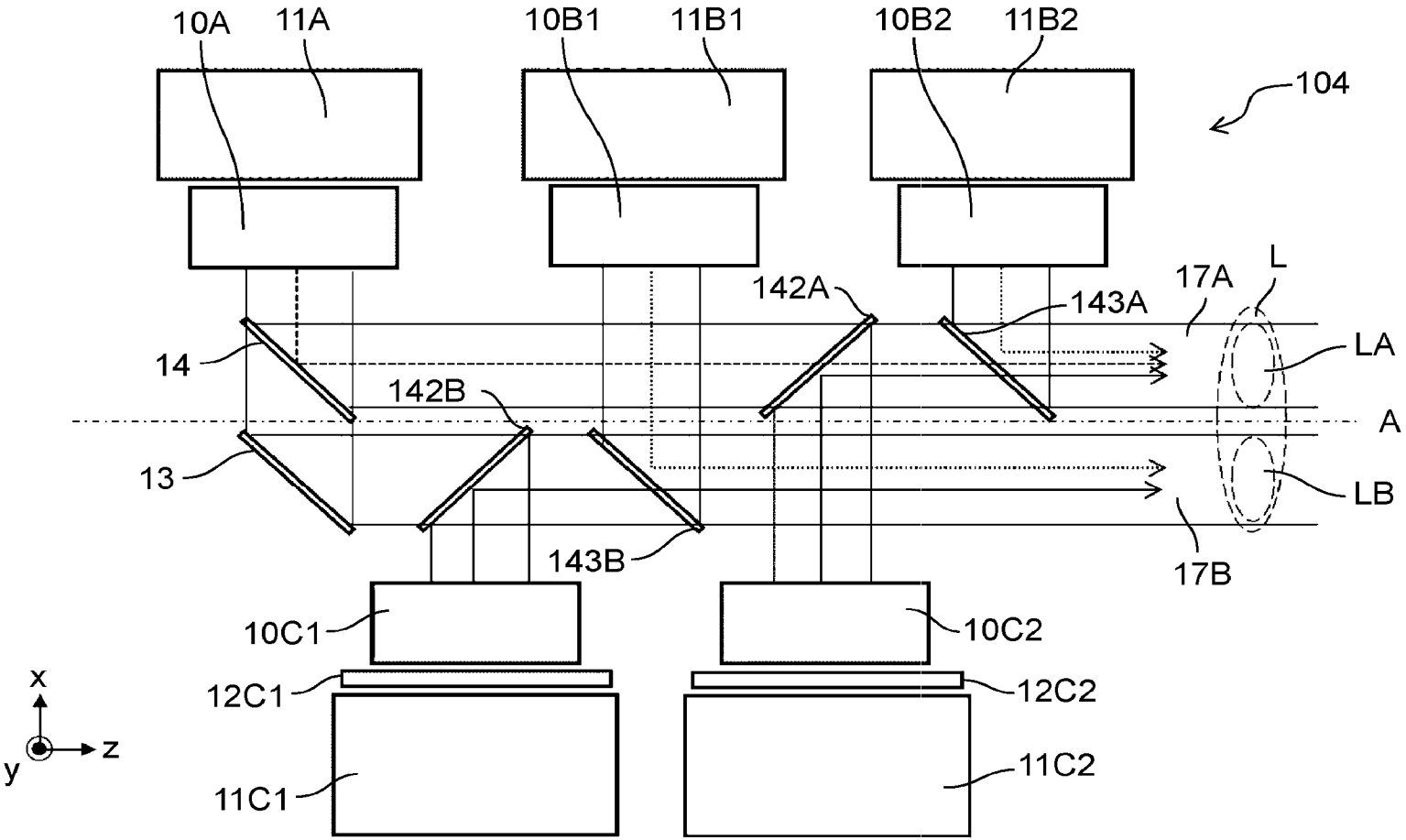
FIG. 9 is a diagram showing a light source device in accordance with a fourth exemplary embodiment.

FIG. 9 shows a configuration of a principal part of a projection display apparatus in accordance with the fourth exemplary embodiment, that is, a configuration of light source device 104. Configurations after lens 121 are the same as those shown in FIG. 1. The fourth exemplary embodiment has a configuration in which third solid-state light source array 10C1 is positioned to confront to a middle point between first solid-state light source array 10A and second solid-state light source array 10B1, and third solid-state light source array 10C2 is positioned to confront to a middle point between second solid-state light source array 10B1 and second solid-state light source array 10B2. The fourth exemplary embodiment includes dichroic mirrors having two types of characteristics, that is, two dichroic mirrors 142A and 142B, and two dichroic mirrors 143A and 143B. Dichroic mirrors 142A and 142B have characteristics shown in FIG. 5C, and dichroic mirrors 143A and 143B have characteristics shown in FIG. 5D.

Blue light reflected by half mirror 14 among the blue light emitted from first solid-state light source array 10A, green light emitted from second solid-state light source array 10B2, and red light emitted from third solid-state light source array 10C2 are combined into the light flux LA of white light by dichroic mirror 142A reflecting red light and transmitting blue light and dichroic mirror 143A reflecting green light and transmitting blue and red light, and the light flux LA travels on first optical path 17A.

Blue light passing through half mirror 14 and reflected by mirror 13 among the blue light emitted from first solid-state light source array 10A, green light emitted from second solid-state light source array 10B1 and red light emitted from third solid-state light source array 10C1 are combined into the light flux LB of white light by dichroic mirror 142B reflecting red light and transmitting blue light and dichroic mirror 143B reflecting green light and transmitting blue and red light, and the light flux LB travels on second optical path 17B.

In this exemplary embodiment, half mirror 14, mirror 13, and dichroic mirrors 142A (first dichroic mirror), 142B (third dichroic mirror), 143A (second dichroic mirror), and 143B (fourth dichroic mirror) form a light combiner. Also in this exemplary embodiment, as shown in FIG. 9, with respect to the optical axis A of the light flux L emitted from the light combiner as a boundary, third solid-state light source arrays 10C1 and 10C2 are disposed on a first side, and first solid-state light source array 10A and second solid-state light source arrays 10B1 and 10B2 are disposed on a second side.

Operation and Advantageous Effect

In the fourth exemplary embodiment, as in the first exemplary embodiment, since each color light is combined in small size using a mirror group, the efficiency of using light is improved. Furthermore, by alternately disposing solid-state light source arrays facing each other with the optical axis A as a center, it is possible to achieve an effect of enabling the size of the light combiner of the light source to be reduced. As compared with the first exemplary embodiment, since an interval between third solid-state light source array 10C1 and third solid-state light source array 10C2 that need to be used under low temperature conditions is widened, installation of a cooling mechanism is further facilitated.

Fifth Exemplary Embodiment

Hereinafter, a fifth exemplary embodiment is described with reference to FIG. 10. In the following, differences with respect to the first exemplary embodiment are mainly described. Since the other configurations are the same as those in the first exemplary embodiment, the same reference numerals are given to the same components, and a duplicate description thereof is omitted.

Figure 10:
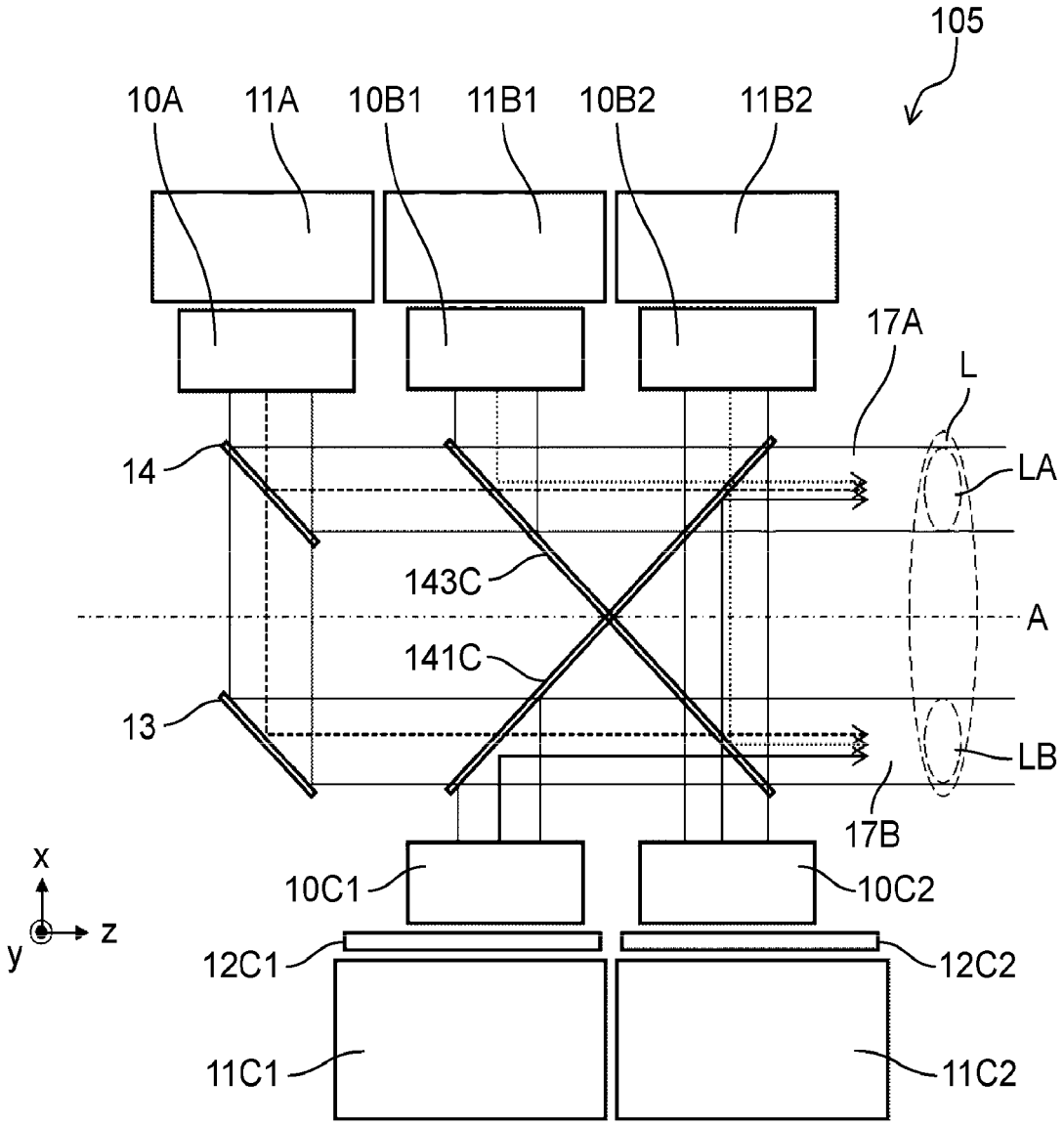
FIG. 10 is a diagram showing a light source device in accordance with a fifth exemplary embodiment.

FIG. 10 shows a configuration of a principal part of a projection display apparatus in accordance with the fifth exemplary embodiment, that is, a configuration of light source device 105. Configurations after lens 121 are the same as those shown in FIG. 1. The fifth exemplary embodiment includes two large dichroic mirrors 143C and 141C. These dichroic mirrors 143C and 141C are cross-arranged to form a cross-dichroic mirror. As shown in FIG. 5D, dichroic mirror 143C has characteristics of transmitting blue light and red light and reflecting green light. As shown in FIG. 5C, dichroic mirror 141C has characteristics of transmitting blue light and green light and reflecting red light.

Blue light reflected by half mirror 14 among the blue light emitted from first solid-state light source array 10A, green light emitted from second solid-state light source array 10B1 and reflected by dichroic mirror 143C, and red light emitted from third solid-state light source array 10C2, passing through dichroic mirror 143C, and reflected by dichroic mirror 141C are combined into the light flux LA of white light, and the light flux LA travels through first optical path 17A.

Blue light passing through half mirror 14 and reflected by mirror 13 among the blue light emitted from first solid-state light source array 10A, green light emitted from second solid-state light source array 10B2, passing through dichroic mirror 141C, and reflected by dichroic mirror 143C, and red light emitted from third solid-state light source array 10C1 and reflected by dichroic mirror 141C are combined into the light flux LB of white light, and the light flux LB travels on second optical path 17B.

In this exemplary embodiment, half mirror 14, mirror 13, and dichroic mirrors 143C (first dichroic mirror) and 141C (second dichroic mirror) form a light combiner. Also in this exemplary embodiment, as shown in FIG. 10, with respect to the optical axis A of the light flux L emitted from the light combiner as a boundary, third solid-state light source arrays 10C1 and 10C2 are disposed on a first side, and first solid-state light source array 10A and second solid-state light source arrays 10B1 and 10B2 are disposed on a second side.

Operation and Advantageous Effect

The fifth exemplary embodiment has an effect of reducing the number of dichroic mirrors in the light combiner. Furthermore, as in the first exemplary embodiment, by dividing the installation sides of solid-state light source arrays depending on necessary temperature conditions, installation property of the cooling mechanism can be improved.

Sixth Exemplary Embodiment

A sixth exemplary embodiment is described with reference to FIGS. 11 to 15. In the following, differences with respect to the first exemplary embodiment are mainly described. Since the other configurations are the same as those in the first exemplary embodiment, the same reference numerals are given to the same components, and a duplicate description thereof is omitted.

Figure 11:
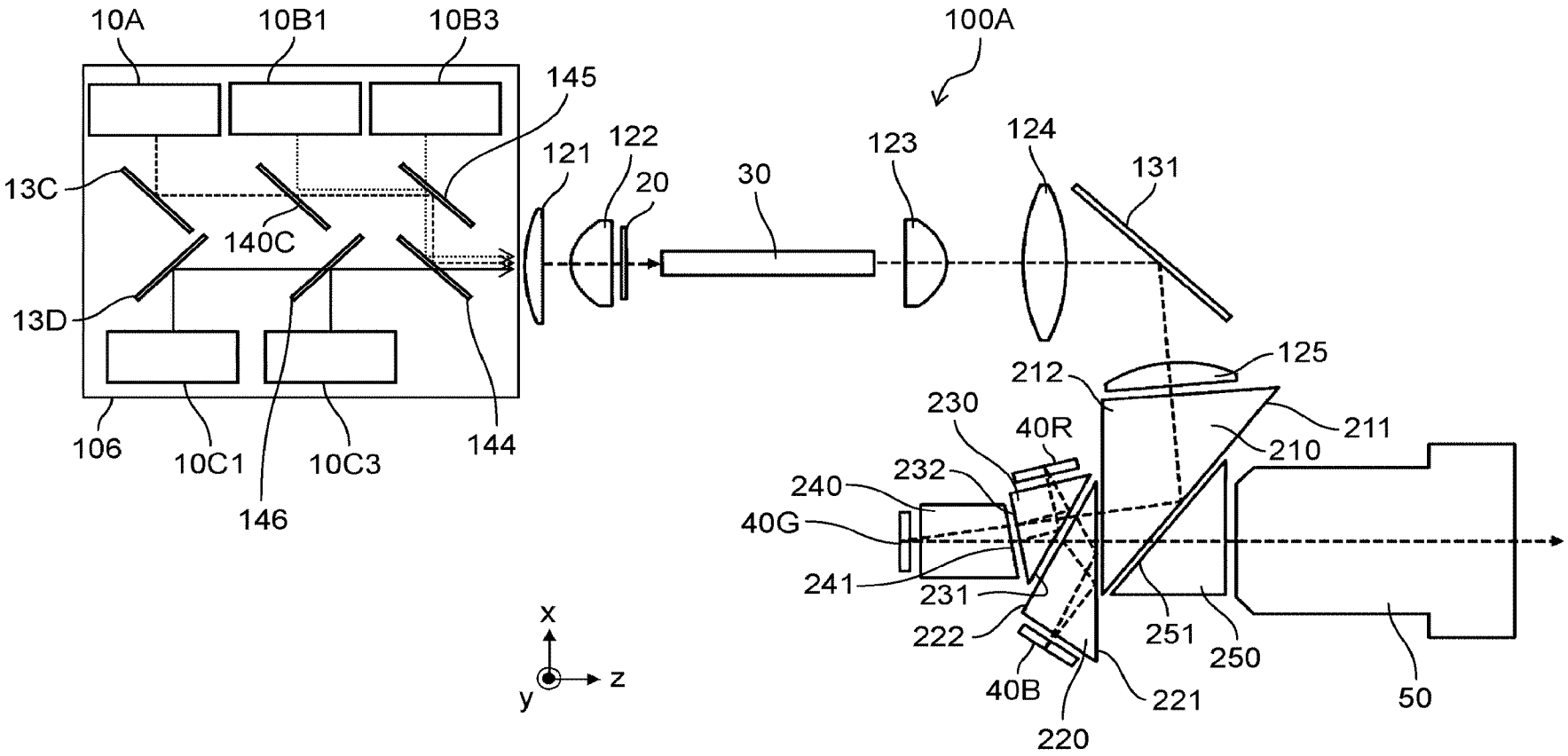
FIG. 11 is a diagram showing a projection display apparatus in accordance with a sixth exemplary embodiment.
Figure 12:
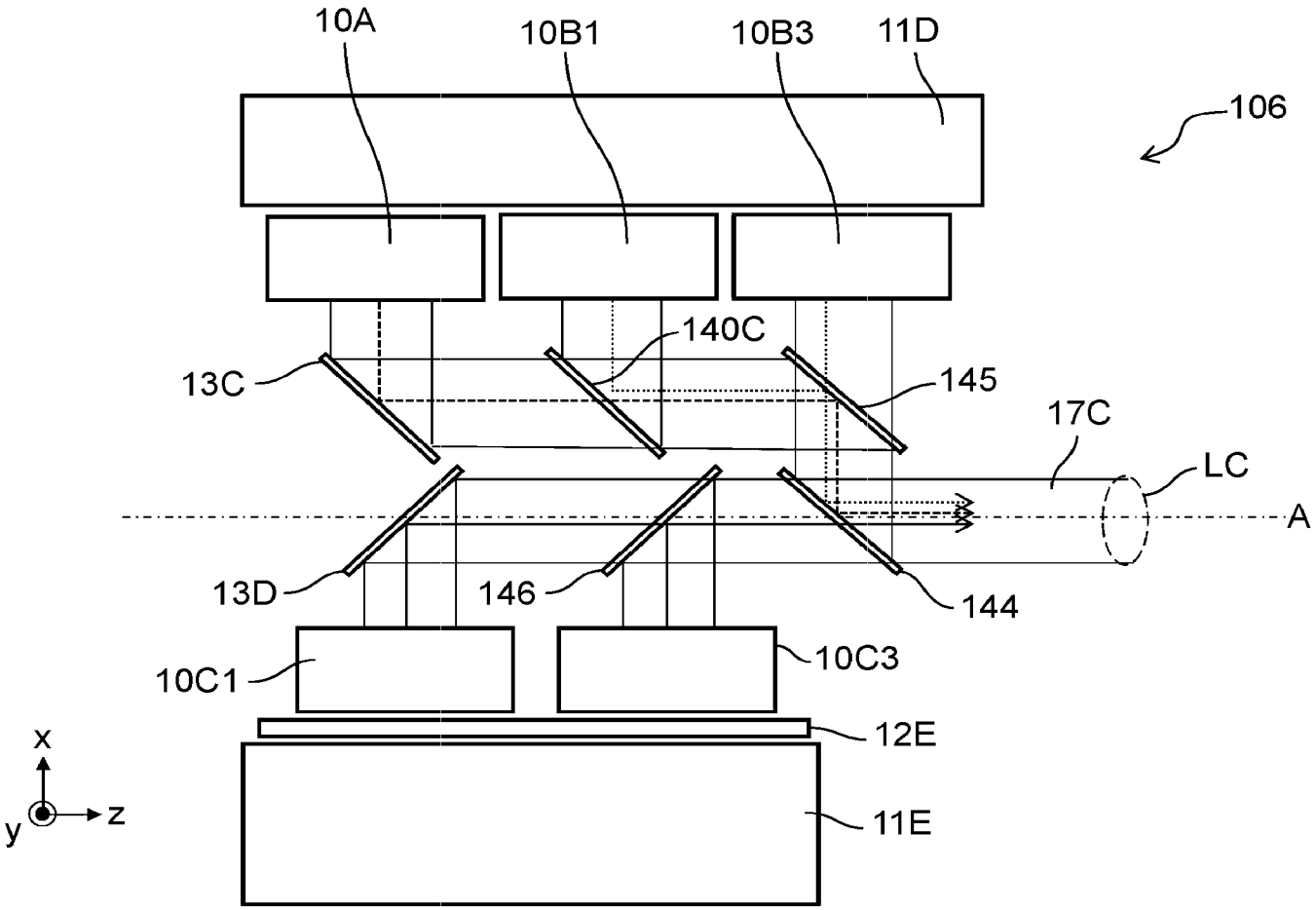
FIG. 12 is a diagram showing a light source device in accordance with the sixth exemplary embodiment.
Figure 13:
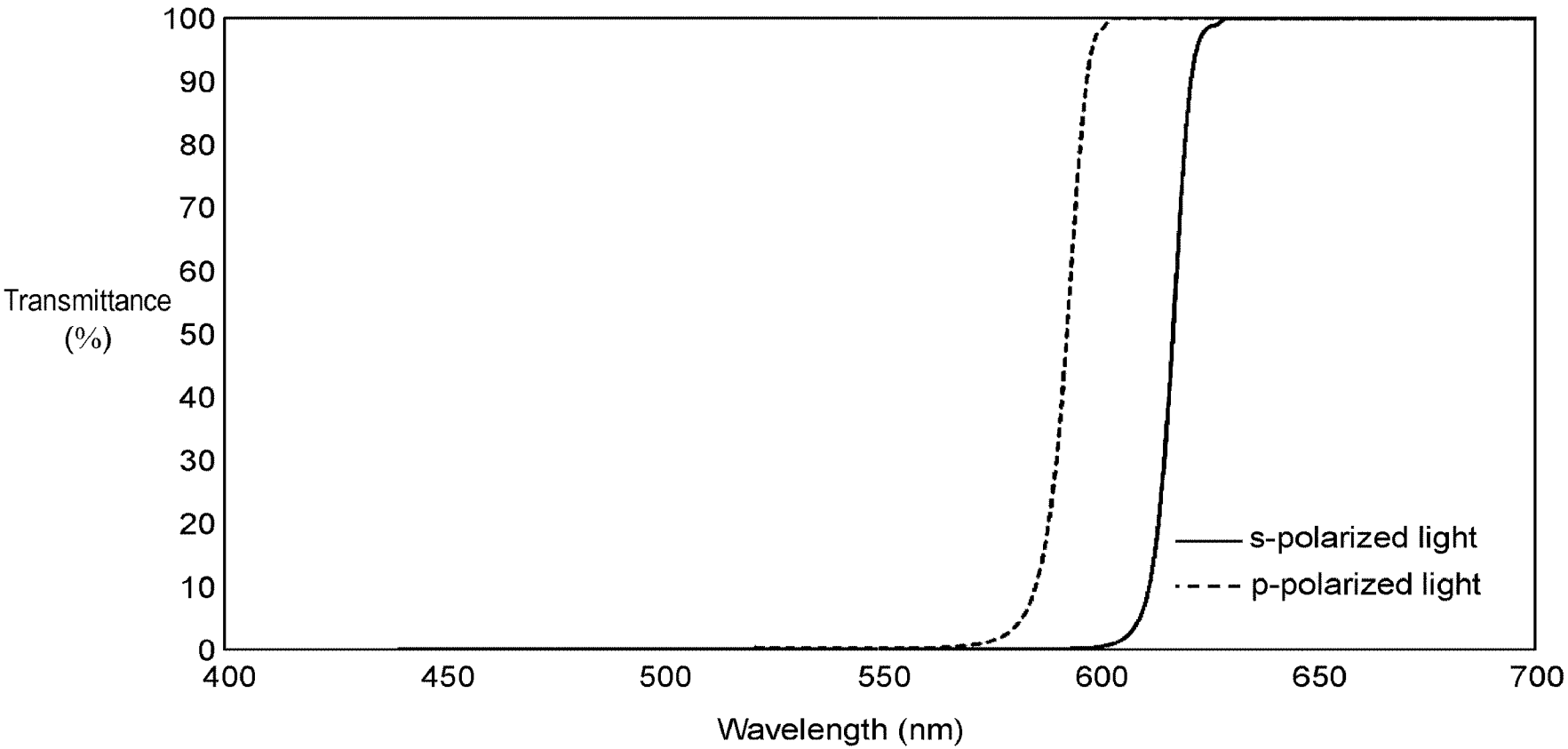
FIG. 13 is a graph showing characteristics of dichroic mirror 144 in accordance with the sixth exemplary embodiment.
Figure 14:
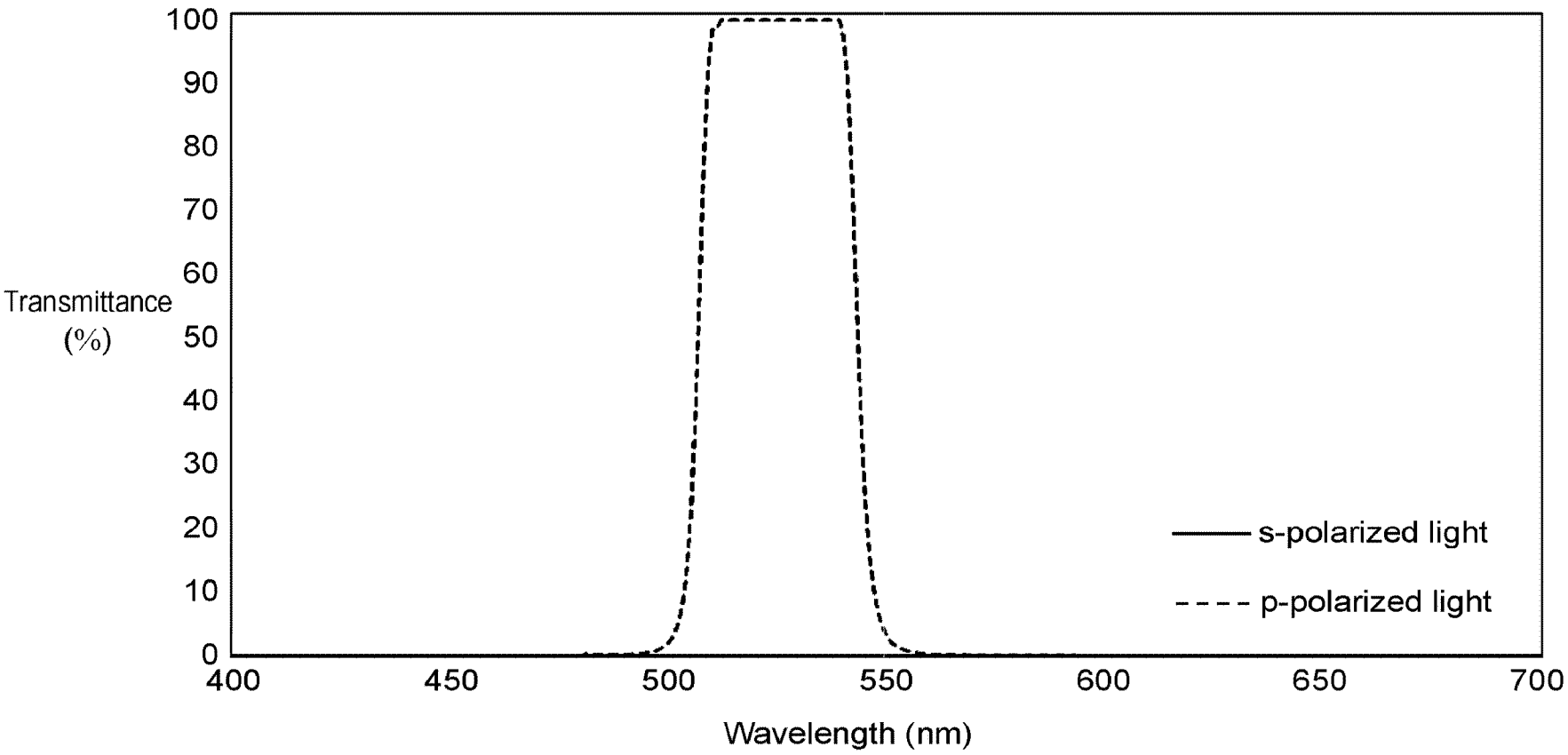
FIG. 14 is a graph showing characteristics of polarization beam splitter 145 in accordance with the sixth exemplary embodiment.
Figure 15:
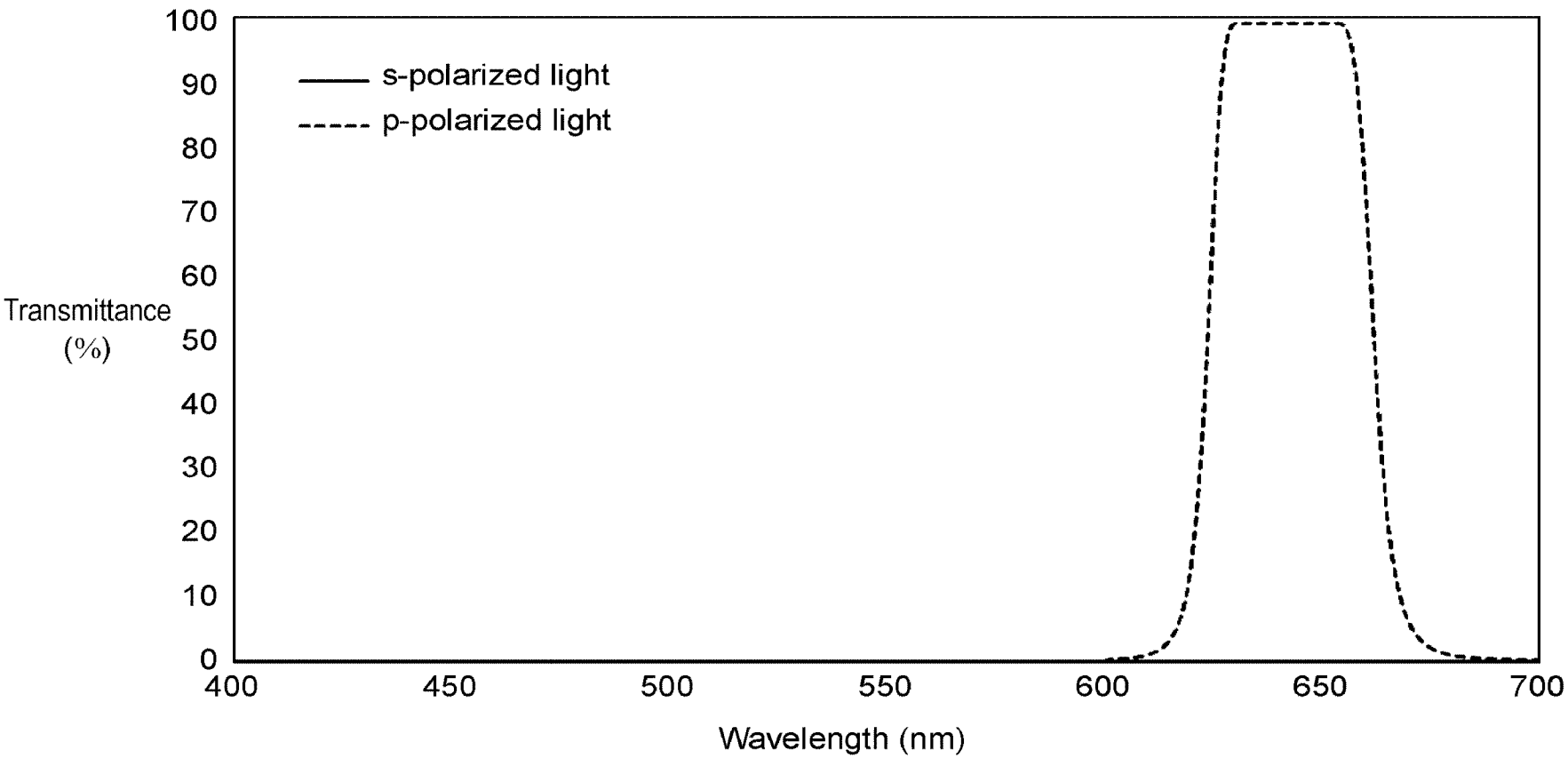
FIG. 15 is a graph showing characteristics of polarization beam splitter 146 in accordance with the sixth exemplary embodiment.

FIG. 11 shows a configuration of a projection display apparatus 100A in accordance with the sixth exemplary embodiment. FIG. 12 shows a detailed configuration of light source device 106 of projection display apparatus 100A. Configurations from lens 121 to projection unit 50 are the same as those of projection display apparatus 100 shown in FIG. 1. As shown in FIG. 12, light source device 106 includes first solid-state light source array 10A, second solid-state light source arrays 10B1 and 10B3, third solid-state light source arrays 10C1 and 10C3, two mirrors 13C and 13D, two dichroic mirrors 140C and 144, and two polarization beam splitters 145 and 146.

Laser diodes 16A, 16B, and 16C are arranged respectively such that first solid-state light source array 10A emits s-polarized blue light, second solid-state light source array 10B1 emits green light of the s-polarized light, second solid-state light source array 10B3 emits p-polarized green light, third solid-state light source array 10C1 emits p-polarized red light, and third solid-state light source array 10C3 emits s-polarized red light.

Both of two mirrors 13C and 13D are a total reflection mirror. Dichroic mirror 140C has characteristics shown in FIG. 5B, and transmits blue light and reflects green light. Dichroic mirror 144 has characteristics shown in FIG. 13, reflects blue light and green light, and transmits red light. Polarization beam splitter 145 has characteristics shown in FIG. 14, and reflects s-polarized light and transmits p-polarized green light. Polarization beam splitter 146 has characteristics shown in FIG. 15, and reflects the s-polarized light and transmits p-polarized red light.

Blue light (s-polarized light) emitted from first solid-state light source array 10A is reflected by mirror 13C, passes through dichroic mirror 140C, is reflected by polarization beam splitter 145 and dichroic mirror 144, and travels on optical path 17C.

Green light (s-polarized light) emitted from second solid-state light source array 10B1 is reflected by dichroic mirror 140C, polarization beam splitter 145, and dichroic mirror 144, and travels on optical path 17C. Green light (p-polarized light) emitted from second solid-state light source array 10B3 passes through polarization beam splitter 145, is reflected by dichroic mirror 144, and travels on optical path 17C.

Red light (p-polarized light) emitted from third solid-state light source array 10C1 is reflected by mirror 13D, passes through polarization beam splitter 146 and dichroic mirror 144, and travels on optical path 17C. Red light (s-polarized light) emitted from third solid-state light source array 10C3 is reflected by polarization beam splitter 146, passes through dichroic mirror 144, and travels on optical path 17C.

In this way, blue light emitted from first solid-state light source array 10A, green light emitted from second solid-state light source arrays 10B1 and 10B3, and red light emitted from third solid-state light source arrays 10C1 and 10C3 are combined into a light flux LC of white light, and the light flux LC travels on optical path 17C along the optical axis A in the +z direction.

In this exemplary embodiment, two mirrors 13C (first mirror) and 13D (second mirror), two dichroic mirrors 140C (first dichroic mirror) and 144 (second dichroic mirror), and two polarization beam splitters 145 (first polarization beam splitter) and 146 (second polarization beam splitter) form a light combiner. Furthermore, also in this this exemplary embodiment, as shown in FIG. 11, with the optical axis A of the light flux LC emitted from light combiner as a boundary, third solid-state light source arrays 10C1 and 10C3 are disposed on a first side, and first solid-state light source array 10A and second solid-state light source arrays 10B1 and 10B3 are disposed on a second side.

Furthermore, in light source device 106 in this exemplary embodiment, as shown in FIG. 12, similar to light source device 101 (see FIG. 6) described in the first exemplary embodiment, large cooling mechanism 11D is disposed adjacent to first solid-state light source array 10A and second solid-state light source arrays 10B1 and 10B3. Large cooling mechanism 11E is disposed adjacent to third solid-state light source arrays 10C1 and 10C3 via Peltier element 12E. Note here that instead of cooling mechanisms 11D and 11E and Peltier element 12E, similar to light source device 10 (see FIG. 2) described in the first exemplary embodiment, cooling mechanisms 11A, 11B1, 11B2, 11C1, and 11C2, and Peltier elements 12C1 and 12C2 can be used.

Furthermore, second solid-state light source array 10B3 may emit s-polarized green light, and a half-wave plate may be disposed in the optical path of the green light between second solid-state light source array 10B3 and polarization beam splitter 145, so that the s-polarized green light emitted from second solid-state light source array 10B3 may be converted into the p-polarized light and enter polarization beam splitter 145. Similarly, third solid-state light source array 10C3 may emit p-polarized red light, and half-wave plate may be disposed in the optical path of red light between third solid-state light source array 10C3 and polarization beam splitter 146, so that the p-polarized red light emitted from third solid-state light source array 10C3 may be converted into s-polarized light and enters polarization beam splitter 146.

Furthermore, this exemplary embodiment may have a configuration in which first solid-state light source array 10A emits p-polarized blue light, second solid-state light source array 10B1 emits p-polarized green light, second solid-state light source array 10B3 emits s-polarized green light, polarization beam splitter 145 reflects p-polarized light and transmits the s-polarized green light. Similarly, this exemplary embodiment may have a configuration in which third solid-state light source array 10C1 emits s-polarized red light, third solid-state light source array 10C3 emits p-polarized red light, polarization beam splitter 146 transmits s-polarized light and reflects p-polarized red light. In this way, in the sixth exemplary embodiment, the polarization direction of laser light emitted from the solid-state light source array and characteristics of polarized light to the polarization beam splitter can be appropriately set.

Operation and Advantageous Effect

In the sixth exemplary embodiment, as compared with the light source devices described in the first to fifth exemplary embodiments, the size of the light flux can be made half, and an optical system after the light flux from the light source device enters can be reduced in size. Furthermore, since the size of the light flux can be made in about half, distribution of brightness of an exit pupil of the projection lens in the projection unit is made uniform, an effect of reducing speckle is achieved. Furthermore, as in the first exemplary embodiment, by dividing installation sides of solid-state light source arrays depending on necessary temperature conditions, installation property of the cooling mechanism can be improved.

Note here that since the above exemplary embodiments are for exemplifications of the technology in the present disclosure, various changes, permutations, additions, omissions, etc., can be made in the scope of the patent claims or in its equivalent scope.

INDUSTRIAL APPLICABILITY

The present disclosure is applicable to a projection display apparatus such as a projector.

What is claimed is:

1. A light source device comprising:

a first solid-state light source array emitting a [first color] *blue* light;

a second solid-state light source array emitting a [second color] *green* light;

a third solid-state light source array emitting a [third color] *red* light; [and]

a light combiner for combing the first to third color lights emitted respectively from the first to third solid-state light source arrays into a combined color light, and emitting a light flux of the combined color light in a same direction; *and*

*a lens transmitting the light flux emitted from the light combiner,* wherein with an optical axis of the [light flux emitted from the light combiner] *lens*, as a boundary, the third solid-state light source array [requiring a lowest target cooling temperature among the first to third solid-state light source arrays] is disposed on a first side, and the first solid-state light source array and the second solid-state light source array are disposed on a second side,

[wherein the first solid-state light source array is a blue solid-state light source array including a blue laser diode emitting blue light as the first color light,]

*wherein* the second solid-state light source array [is a green solid-state light source array including a green laser diode emitting green light as the second color light, and] includes first and second green solid-state light source arrays, the third solid-state light source array [is a red solid-state light source array including a red laser diode emitting red light as the third color light, and] includes first and second red solid-state light source arrays, the first green solid-state light source array and the first red solid-state light source array are disposed to confront each other, and the second green solid-state light source array and the second red solid-state light source array are disposed to confront each other.

2. The light source device according to claim 1, further comprising cooling mechanisms each of which is disposed adjacent to each of the first to third solid-state light source arrays, and further comprising a Peltier element for cooling disposed adjacent to the third solid-state light source.

3. The light source device according to claim 1, wherein the light combiner comprises:

a half mirror which the blue light from the [blue] *first* solid-state light source array enters;

a mirror reflecting blue light passing through the half mirror;

a first dichroic mirror reflecting the green light from the first green solid-state light source array, and transmitting blue light reflected by the half mirror;

a second dichroic mirror reflecting the red light from the second red solid-state light source array, and transmitting the blue light and the green light from the first dichroic mirror;

a third dichroic mirror reflecting the red light from the first red solid-state light source array, and transmitting the blue light reflected by the mirror; and a fourth dichroic mirror reflecting the green light from the second green solid-state light source array, and transmitting the blue light and the red light from the third dichroic mirror.

4. A light source device comprising:

a first solid-state light source array emitting a [first color] *blue* light;

a second solid-state light source array emitting a [second color] *green* light;

a third solid-state light source array emitting a [third color] *red* light; [and]

a light combiner for combing the first to third color lights emitted respectively from the first to third solid-state light source arrays into a combined color light, and emitting a light flux of the combined color light in a same direction; *and*

*a lens transmitting the light flux emitted from the light combiner,* wherein with an optical axis of the [light flux emitted from the light combiner] *lens*, as a boundary, the third solid-state light source array [requiring a lowest target cooling temperature among the first to third solid-state light source arrays] is disposed on a first side, and the first solid-state light source array and the second solid-state light source array are disposed on a second side,

[wherein the first solid-state light source array is a blue solid-state light source array including a blue laser diode emitting blue light as the first color light,]

*wherein* the second solid-state light source array [is a green solid-state light source array including a green laser diode emitting green light as the second color light, and] includes first and second green solid-state light source arrays, the third solid-state light source array [is a red solid-state light source array including a red laser diode emitting red light as the third color light, and] includes first and second red solid-state light source arrays, and the second green solid-state light source array and the first red solid-state light source array are disposed to confront each other.

5. The light source device according to claim 4, wherein the light combiner comprise:

a half mirror which the blue light from the [blue] *first* solid-state light source array enters;

a mirror reflecting blue light passing through the half mirror;

a first dichroic mirror reflecting the green light from the second green solid-state light source array and transmitting blue light reflected by the half mirror;

a second dichroic mirror reflecting the red light from the second red solid-state light source array, and transmitting the blue light and the green light from the first dichroic mirror;

a third dichroic mirror reflecting the green light from the first green solid-state light source array, and transmitting the blue light reflected by the mirror; and a fourth dichroic mirror reflecting the red light from the first red solid-state light source array, and transmitting the blue light and the green light from the third dichroic mirror.

6. The light source device according to claim 1, wherein the light combiner comprises:

a half mirror which the blue light from the [blue] *first* solid-state light source array enters;

a first mirror reflecting blue light passing through the half mirror;

a second mirror reflecting the red light from the first red solid-state light source array;

a third mirror reflecting the red light from the second mirror;

a first dichroic mirror reflecting the green light from the second green solid-state light source array, and transmitting blue light reflected by the half mirror;

a second dichroic mirror reflecting the red light from the third mirror, and transmitting the blue light and the green light from the first dichroic mirror;

a third dichroic mirror reflecting the green light from the first green solid-state light source array, and transmitting the blue light reflected by the first mirror; and a fourth dichroic mirror reflecting the red light from the second red solid-state light source array, and transmitting the blue light and the green light from the third dichroic mirror.

7. A light source device comprising:

a first solid-state light source array emitting a [first color] *blue* light;

a second solid-state light source array emitting a [second color] *green* light;

a third solid-state light source array emitting a [third color] *red* light; and a light combiner for combing the first to third color lights emitted respectively from the first to third solid-state light source arrays into a combined color light, and emitting a light flux of the combined color light in a same direction; *and*

*a lens transmitting the light flux emitted from the light combiner,* wherein with an optical axis of the [light flux emitted from the light combiner] *lens*, as a boundary, the third solid-state light source array [requiring a lowest target cooling temperature among the first to third solid-state light source arrays] is disposed on a first side, and the first solid-state light source array and the second solid-state light source array are disposed on a second side,

[wherein the first solid-state light source array is a blue solid-state light source array including a blue laser diode emitting blue light as the first color light,]

*wherein* the second solid-state light source array [is a green solid-state light source array including a green laser diode emitting green light as the second color light, and] includes first and second green solid-state light source arrays, the third solid-state light source array [is a red solid-state light source array including a red laser diode emitting red light as the third color light, and] includes first and second red solid-state light source arrays, the first red solid-state light source array is disposed in a position confronting a [middle] point between [a blue] *the first* solid-state light source array and the first green solid-state light source array, and the second red solid-state light source array is disposed in a position confronting a [middle] point between the first green solid-state light source array and the second green solid-state light source array.

8. The light source device according to claim 7, wherein the light combiner comprises:

a half mirror which the blue light from the [blue] *first* solid-state light source array enters;

a mirror reflecting blue light passing through the half mirror;

a first dichroic mirror reflecting the red light from the second red solid-state light source array, and transmitting blue light from the half mirror;

a second dichroic mirror reflecting the green light from the second green solid-state light source array, and transmitting the blue light and the red light from the first dichroic mirror;

a third dichroic mirror reflecting the red light from the first red solid-state light source array and transmitting the blue light from the mirror; and a fourth dichroic mirror reflecting the green light from the first green solid-state light source array, and transmitting the blue light and the red light from the third dichroic mirror.

9. The light source device according to claim 1, wherein the light combiner comprises:

a half mirror which the blue light from the [blue] *first* solid-state light source array enters;

a mirror reflecting blue light passing through the half mirror;

a first dichroic mirror reflecting the green light from the first and second green solid-state light source arrays, transmitting blue light from the half mirror and the blue light from the mirror, and transmitting the red light from the second red solid-state light source array; and a second dichroic mirror reflecting the red light from the first and second red solid-state light source arrays, transmitting the blue light from the half mirror and the blue light from the mirror, and transmitting the green light from the second green solid-state light source array, wherein the first dichroic mirror and the second dichroic mirror are cross-arranged to form a cross-dichroic mirror.

10. The light source device according to claim 7, wherein the light combiner comprises:

a first mirror reflecting the blue light from the [blue] *first* solid-state light source array;

a second mirror reflecting the red light from the first red solid-state light source array;

a first dichroic mirror reflecting the green light from the first green solid-state light source array, and transmitting the blue light reflected by the first mirror;

a first polarization beam splitter transmitting the green light from the second green solid-state light source array, and reflecting the blue light and the green light from the first dichroic mirror;

a second polarization beam splitter reflecting the red light from the second red solid-state light source array, and transmitting the red light reflected by the second mirror; and a second dichroic mirror reflecting the blue light and the green light from the first polarization beam splitter, and transmitting the red light from the second polarization beam splitter.

11. A projection display apparatus comprising:

a light source device according to claim 1;

an image light generating part modulating light obtained by the light source device based on an image signal to generate image light; and a projection optical system magnifying and projecting the image light generated by the image light generating part.

*12. The light source device according to claim 7, wherein the light combiner comprises:*

*a first mirror reflecting the blue light from the first solid-state light source array;*

*a second mirror reflecting the red light from the first red solid-state light source array;*

*a first dichroic mirror reflecting the green light from the first green solid-state light source array, and transmitting the blue light reflected by the first mirror;*

*a first polarization beam splitter transmitting the green light from the second green solid-state light source array, and reflecting the blue light and the green light from the first dichroic mirror;*

*a second polarization beam splitter reflecting the red light from the second red solid-state light source array, and transmitting the red light reflected by the second mirror; and*

*a second dichroic mirror reflecting the blue light and the green light from the first polarization beam splitter, and transmitting the red light from the second polarization beam splitter.*

*13. A light source device comprising:*

*a first solid-state light source array emitting blue light;*

*a second solid-state light source array emitting green light;*

*a third solid-state light source array emitting red light;*

*a light combiner for combing the blue light, the green light, and the red light emitted respectively from the first to third solid-state light source arrays into a combined color light, and emitting a light flux of the combined color light; and*

*a lens transmitting the light flux emitted from the light combiner,*

*wherein with an optical axis of the lens, as a boundary, the third solid-state light source array is disposed on a first side, and*

*the first solid-state light source array and the second solid-state light source array are disposed on a second side that is opposite to the first side,*

*wherein the second solid-state light source array includes first and second green solid-state light source arrays, and*

*the third solid-state light source array includes first and second red solid-state source arrays, and*

*the light combiner comprises:*

*a first mirror reflecting the blue light from the first solid-state light source array;*

*a second mirror reflecting the red light from the first red solid-state light source array;*

*a first dichroic mirror reflecting the green light from the first green solid-state light source array, and transmitting the blue light reflected by the first mirror;*

*a first polarization beam splitter transmitting the green light from the second green solid-state light source array, and reflecting the blue light and the green light from the first dichroic mirror;*

*a second polarization beam splitter reflecting the red light from the second red solid-state light source array, and transmitting the red light reflected by the second mirror; and*

*a second dichroic mirror reflecting the blue light and the green light from the first polarization beam splitter, and transmitting the red light from the second polarization beam splitter.*

*14. The light source device according to claim 13, wherein the first red solid-state light source array and a part of the first solid-state light source array are disposed to confront each other, and the second red solid-state light source array and a part of the first green solid-state light source array are disposed to confront each other.*

*15. The light source device according to claim 1, wherein the third solid-state light source array requires a lowest target cooling temperature among the first to third solid-state light source arrays.*

*16. The light source device according to claim 4, wherein the third solid-state light source array requires a lowest target cooling temperature among the first to third solid-state light source arrays.*

*17. The light source device according to claim 7, wherein the third solid-state light source array requires a lowest target cooling temperature among the first to third solid-state light source arrays.*

* * * * *